Nov. 20, 1951

W. B. BLANTON ET AL 2,575,329

TELEGRAPH SWITCHING SYSTEM

Filed Aug. 2, 1949

INVENTORS
W. B. BLANTON
G. G. LIGHT

BY

M.R. Marsh

ATTORNEY

INVENTORS
W. B. BLANTON
G. G. LIGHT

ATTORNEY

Patented Nov. 20, 1951

2,575,329

UNITED STATES PATENT OFFICE 2,575,329

TELEGRAPH SWITCHING SYSTEM

William B. Blanton, Rockville Centre, and George G. Light, Scarsdale, N. Y., assignors to The Western Union Telegraph Company, New York, N. Y., a corporation of New York Application August 2, 1949, Serial No. 108,208

15 Claims. (Cl. 178—2)

This invention relates to telegraph switching systems and more particularly to a telegraph switching system wherein messages received at a telegraph switching center are automatically switched to desired destinations and incident to the switching, the messages are temporarily stored one or more times in a signal storage medium such as a perforated tape.

In general the principal object of the present invention is to provide an automatic telegraph switching system of the above type and to incorporate therein checking and guard circuits and controls to insure that switched messages are routed to their correct and intended destinations.

A more specific object of the invention resides in the provision of an improved automatic switching arrangement and one wherein a switching operation is not initiated until the complete message to be switched has been received and stored at the switching center.

In an embodiment of the invention described herein a message received at a switching center is first stored in a perforated tape at what is called a receiving position and then transmitted intraoffice to a sending position of the desired outgoing line where the message is again stored in a perforated tape which subsequently controls a transmitting means to transmit the message to the representative outgoing circuit. The intraoffice transmission of the message to the proper sending position is controlled by a so-called automatic switching control unit which operates in conjunction with directing characters received with each message. In this connection it is another object of the present invention to provide a checking arrangement which automatically insures that at least the identifying portion of each message automatically switched through the switching center has been received and correctly perforated in the tape at a sending position.

Each automatic switching control unit at a switching center serves a number of receiving positions as, for example, twelve, and another object of the present invention is to prevent any one of the receiving positions associated with an automatic switching control unit from tying up or holding it for an unduly long interval and thereby prevent the other receiving positions from having access to the control unit. In this respect the failure of the automatic switching control unit to complete a switching operation within a predetermined time after a receiving position has been associated therewith causes an alarm device to function to advise the attendant of the condition and automatically disassociates the receiving position from the automatic switching control unit whereby it is permitted to serve the other receiving positions.

The above and further objects of the invention will be more apparent hereinafter in the following description thereof wherein reference is made to the accompanying drawings, in the latter of which:

Fig. 1 is a diagrammatic representation of a switching center embodying principles of the present invention;

Figs. 2 to 8, inclusive, show equipment and circuits of what is referred to hereinafter as the intraoffice transmitter circuit or transmitting position, and includes a so-called sequence number indicator and message waiting indicator;

Figs. 9 to 15, inclusive, show the circuits and equipment of the automatic switching unit together with the connector switches for establishing a circuit from one of the transmitting positions to a reperforator or sending position via an intraoffice circuit;

Figs. 16 to 20, inclusive, show the circuits and equipment of a so-called reperforator or sending position which terminates an intraoffice circuit from the connector switches; and Fig. 21 illustrates the manner in which Figs. 2 to 20 may be arranged with respect to one another to form a complete circuit diagram.

GENERAL DESCRIPTION

The operation in general of the invention will first be set forth with reference to the diagrammatic layout of a switching center in Fig. 1 of the drawings. In Fig. 1 three incoming lines are shown which terminate in so-called receiving positions A, B and C. These incoming lines may be from branch offices or some such message originating point, or from another switching center.

There is also shown in Fig. 1 three so-called sending positions S1, S2 and S3 with associated outgoing lines over which the switched messages are transmitted and which may lead to various destinations such as branch offices or other message destination points. The system of the present invention is adapted to accommodate considerably more than the three incoming and three outgoing lines indicated in Fig. 1, the number of lines shown merely being for the purpose of illustration.

Each receiving position includes a printer perforator 1 which responds to signals received over its associated incoming line to perforate a storage tape 2 to represent the received signals. Also included in each receiving position is a tape transmitter 3 which is controlled by the storage tape 2 to transmit the signals intraoffice to a reperforator such as 146 in a sending position. The tape transmitter is sometimes referred to as the intraoffice transmitter and the reperforator 146 as the intraoffice reperforator. The intraoffice reperforator 146 functions to again store the message signals in a storage tape 147 which controls the line sending tape transmitter 172.

In addition to the printer perforator 1 and tape transmitter 3, each receiving position also includes a message waiting indicator 8 and a sequence number indicator 156. The message waiting indicator 8 indicates the number of complete messages stored at any one time in the storage tape 2 between the printer perforator 1 and the tape transmitter 3, while the sequence number indicator 156 indicates the sequence number which each message should have as it is transmitted by the tape transmitter 3. Besides the reperforator 146 and tape transmitter 172, each sending position includes a so-called reading unit 11 which functions, in a manner hereinafter set forth in more detail, to read certain of the signals perforated in the storage tape 147 and check these signals with those in the sequence number indicator.

Each message received at the receiving position, such as A, B, C, from an incoming line or from a local sending position within the switching center, is preceded by selecting or destination indicating characters, and in the embodiment to be described there are two of these characters. Following the selecting or selection characters are other characters to identify the originating office of the message and the associated switching center together with a sequence number of the message from the particular originating point. Next are the message characters themselves and each message is terminated with an end-of-message signal comprising two consecutive period codes or combinations. The message waiting indicator 8 is operated by the two periods at the end of each message in such a manner that the storage of the message in the tape 2 actuates it in one direction and the transmission of the message by the transmitter 3 actuates it in the opposite direction. Thus the message waiting indicator 8 at all times indicates the number of complete messages stored in the tape 2.

The tape transmitter 3 is arranged to idle therethrough blank tape or period characters which may appear between messages and when the first message character is advanced over the sensing pins further advancement of the tape will cease. If at this time the message waiting indicator 8 indicates that a complete message is stored in the tape 2, an electrical request is made for a so-called automatic switching control unit 12. The automatic switching control unit 12 controls the operation of connector switches such as A, B and C associated with each receiving position whereby a transmission path from the tape transmitter 3 is established over an intraoffice circuit to the desired sending or reperforator position. In the preferred embodiment of the invention a single automatic switching control unit 12 is arranged to serve a plurality of receiving positions and thereby reduce the amount of equipment necessary.

The automatic switching control unit 12 reads and stores the first two characters in the tape which in accordance with the described arrangement will be the selection or destination indicating characters of the message, and then proceeds to operate the associated connector switches A, B and C accordingly. After setting up the intraoffice path through the connector switches, the automatic switching control unit 12 is released and made available to other requests from any one of the other associated receiving positions.

Among the features of the present invention are a number of safeguards. One of these safeguards is an automatic timer which operates an alarm device when the automatic switching control unit 12 is idle and one or more receiving positions is requesting the same and is not connected thereto within a predetermined interval. In this connection another alarm device is operated if the automatic switching control unit 12 does not complete a switching operation within a predetermined interval. In this connection another alarm device is operated if the automatic switching control unit 12 does not complete a switching operation within a predetermined time.

Following the establishment of a transmission path to a sending position, an automatic numbering machine 142, one of which is associated with each sending position, is caused to function and transmit to the sending position reperforator 146 a sequence number representative of the message to be transmitted from this sending position. Thus each message transmitted from a sending position will have its sequence number appended thereto whereby the associated receiving destination may check and determine whether or not messages are lost.

As noted, each message received at a receiving position such as A, B or C, is preceded by its own sequence number and each such position is equipped with a sequence number indicator 156. The sequence number indicators indicate electrically the sequence number which should be appended to each message received at a receiving position along with certain other identifying signals representing the receiving position. Following the establishment of the intraoffice transmission path, the sequence number of a message received at a receiving position is transmitted ahead of the message and reperforated at the receiving position or in the reperforator 146. After the perforation in the tape 146 of this sequence number, which incidentally follows the sequence number in the tape transmitted from the automatic message numbering machine 142, the reading unit 11 compares the received message sequence number character for character along with other identifying signals with those in the receiving position sequence number indicator 156. If the compared sequence number or other identifying characters, such as the receiving position call letters, compare correctly with those in the sequence number indicator, the intraoffice transmission of the message stored in the tape proceeds. However, should the sequence number and call letters not compare correctly with those set up in the sequence number indicator, the intraoffice transmitter 3 is stopped and a signal operated to advise the attendant of this condition. Thus the system disclosed insures that the call letters and sequence number of each message received at a switching center are correctly perforated in the sending position storage tape before transmission of the message is begun. Accordingly, no message will be automatically switched which does not contain adequate and correct identifying signals.

DETAILED DESCRIPTION

Receiving position

Figure 1:
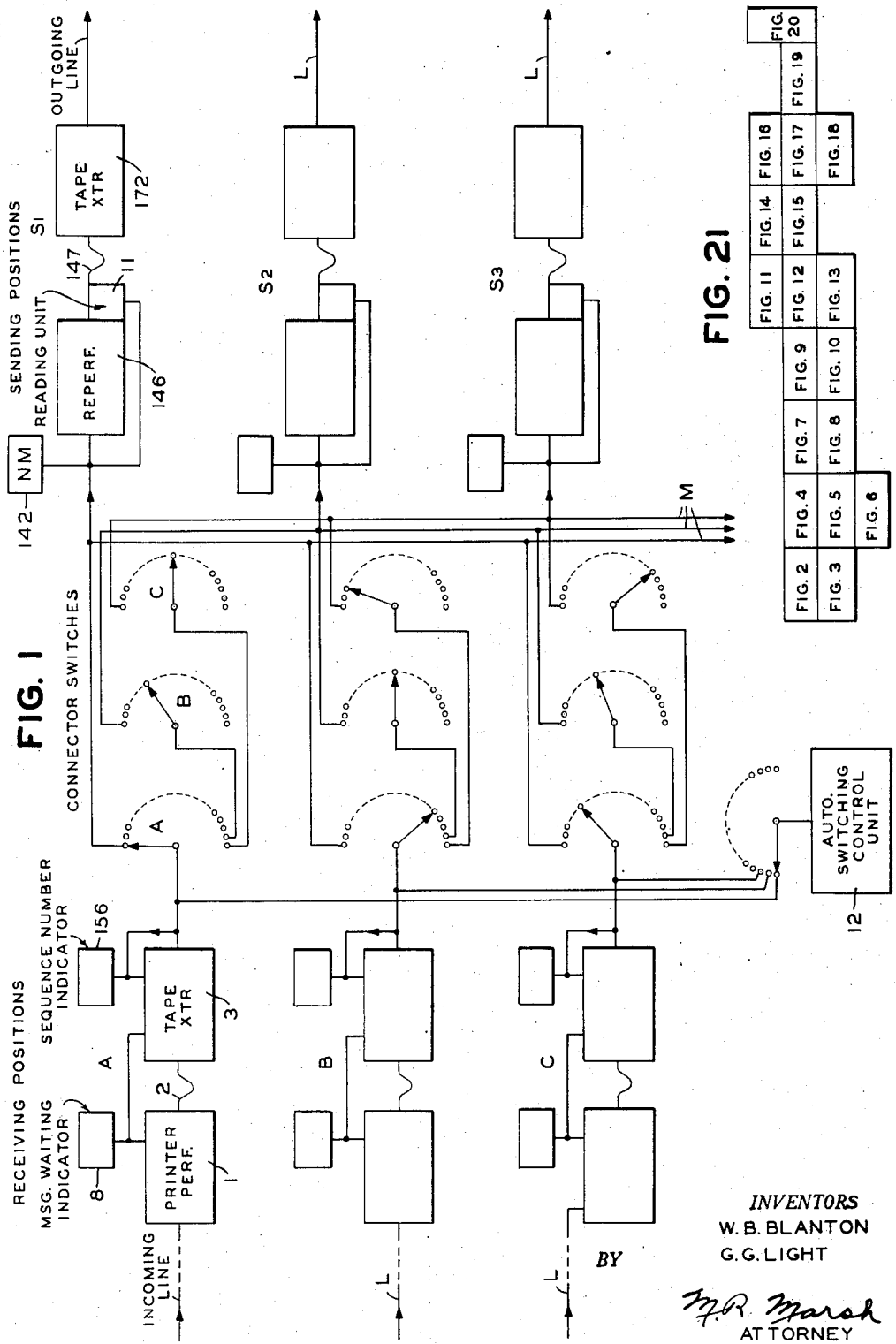
Figure 2:
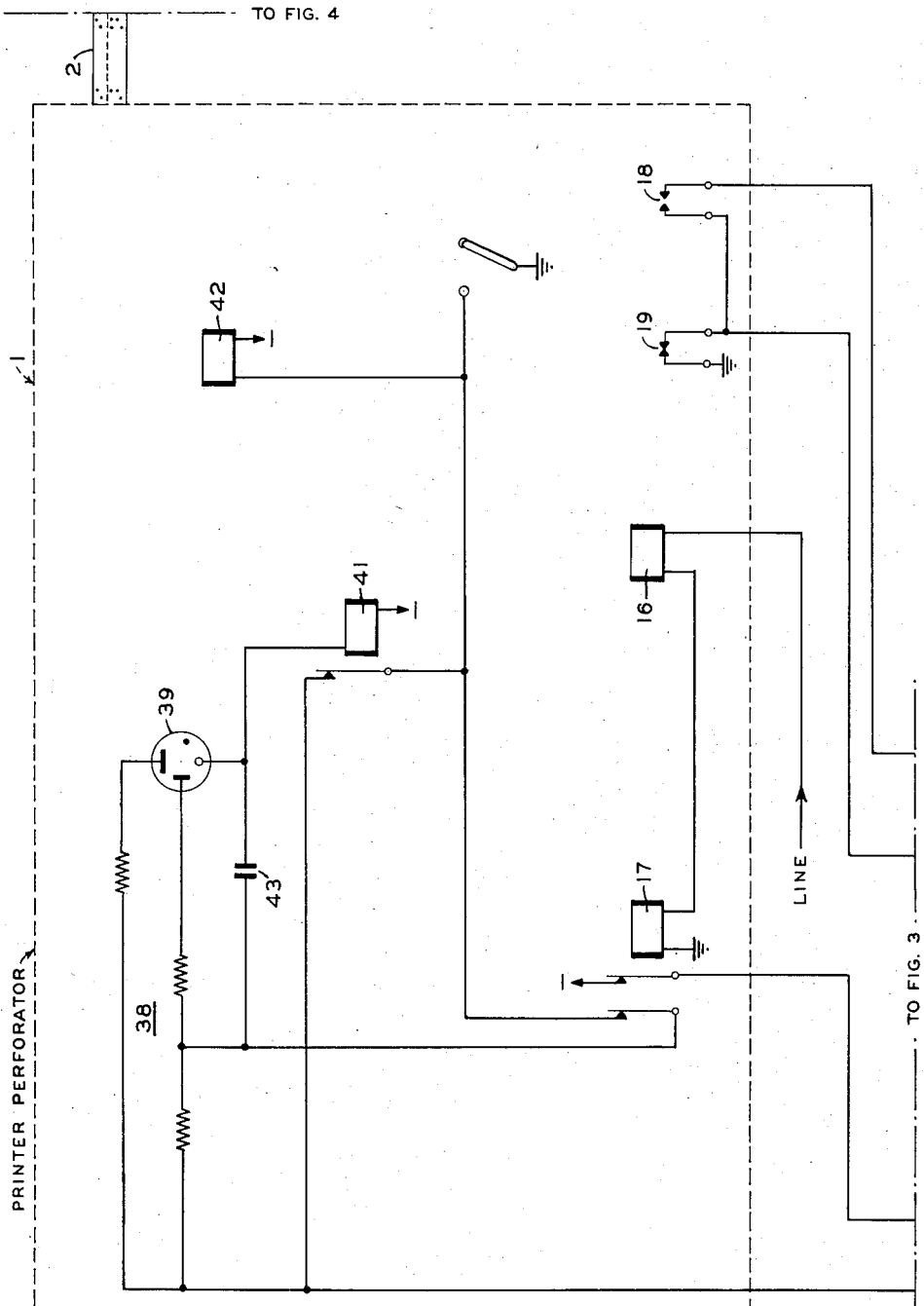

The equipment and circuits of a receiving position which terminates an incoming line, for example, a line from a distant branch office, another switching center or from a local sending position where messages originating at the switching office are prepared, are shown in Figs.

2 to 8, inclusive. The equipment of a receiving position includes primarily a printer-perforator 1 which prepares the perforated tape 2, a tape transmitter 3, a message waiting indicator 8 and a sequence number indicator 156.

It will be assumed that the printer-perforator 1 is of the start-stop type and operates in response to signal code groups each containing a start and stop impulse. If the incoming line should be a multiplex channel, the signals received thereover could readily be converted to start-stop signals by mechanisms well known in the art. The line circuit passes through the selector magnet 16 of the printer perforator and a signal relay 17. The selector magnet 16 controls the printer-perforator to cause the same to perforate the tape 2 with signals representative of those received over the line.

Let it be assumed that the storage tape 2 between the printer-perforator 1 and the tape transmitter 3 has no message signals stored therein and contains no perforations other than blanks, and that subsequently a message is received over the line which the printer-perforator proceeds to store in the tape 2. The message will be preceded by the proper destination indicating or selection characters as well as a message sequence number and other characters to identify the origin of the message. Following the message, the end-of-message signal will be received and it will consist of two consecutive periods. When the two periods are received on the printer-perforator 1, it will indicate that a complete message is stored in the storage tape 2 and the apparatus for detecting the period codes includes contact sets 18 and 19 operated, in an obvious manner, by punch control bars of the printer-perforator. Contacts 18 are closed when the fourth pulse of a code group is marking and contacts 19 open on any code combination having a first, second, third and fifth pulse marking. The code combination for a period consists of the fourth pulse marking only when such a code is received by the printer-re-perforator, the closure of contacts 18 completes a circuit from ground through closed contacts 19, a back contact of relay RAC-2, and the coil of relay RAC-1 to potential. The latter relay thereupon operates and through its front contact completes a circuit through the right hand coil of relay RAC-2. Relay RAC-2, however, does not at this time operate, since the ground applied to the above circuit by the closure of contact 18 short-circuits the right hand coil of relay RAC-2. When the fourth punch control bar of the printer-perforator 1 is reset incident to the next cycle of operation thereof, contacts 18 open and current will flow through the right hand coil of relay RAC-2 to operate it.

If the next code received on the printer-perforator 1 is also a period, the closure of contacts 18 while contacts 19 are maintained closed as the punch control bars are set in accordance with the new code group, causes a circuit to be established from ground through contacts 19 and 18, the left hand tongue and front contact and left hand coil of relay RAC-2 to potential in parallel with the left hand coil of relay RAC-3 to potential. Thus relay RAC-2 is held operated and relay RAC-3 operated. As relay RAC-3 operates, a circuit is completed from ground through its right hand tongue and front contact, a right hand tongue and front contact of relay RAC-2 and through the coil of the "add" magnet 21 of the message waiting indicator 8 to potential. This circuit energizes the "add" magnet 21 and as contacts 18 of the printer perforator open following the cycle of operation of the second period, the circuit through the left hand coil of relay RAC-2 is interrupted causing it to release whereupon it interrupts the circuit through its right hand tongue and the "add" magnet 21 is released.

Relay RAC-2 will remain operated by a circuit through its right hand coil and inner left hand tongue to ground through printer perforator contacts 19. This circuit holding relay RAC-2 energized will be maintained until the printer perforator 1 receives the first character of the succeeding message, which character if other than a period will open contacts 19.

If the character following the first period is any other but another period, as would be the case where periods are used in the text of the message, the character other than a period will cause contacts 19 to open and thereby open the locking circuit through the right hand coil of relay RAC-2 and the coil of relay RAC-1 whereupon said relays release. Thus a single period within a message is not counted by the counting relays RAC-1, -2 and -3, and it is only when two consecutive periods are received that the "add" magnet 21 of the message waiting indicator is energized.

As it was assumed that there were no messages stored in the tape 2, the message waiting indicator 8 prior to the operation of magnet 21 would be in its normal or zero position as shown in the drawings of Fig. 3. The operation of magnet 21, as described, steps the indicator off its zero position and indicates to the circuits that one or more unswitched messages are stored in the tape. The message waiting indicator 8 includes a shaft 22 rotated in one direction, such as a clockwise direction, when its "add" magnet 21 is energized, and in the opposite direction when a "subtract" magnet 23 is energized. The latter magnet, as will hereinafter be set forth, is operated following the operation of the automatic switching control unit in switching a message through the switching center. The "add" and "subtract" magnets 21 and 23 have associated pawls which co-operate with ratchet wheels 24 and 25, respectively, to rotate shaft 22 in opposite directions. Instead of the pawls and ratchets 24 and 25, the message waiting indicator 8 may include a differential operated indicator whereby both of the magnets 21 and 23 could be operated simultaneously.

On the shaft 22 of the message waiting indicator 8 is a cam 26 adapted to operate a pair of transfer contacts 27 and 28. With the indicator 8 in its zero position the movable elements of contacts 27 and 28 are to the right and as the indicator is stepped off its zero position the movable elements are moved to the left. As will be described, these contacts cause the automatic switching equipment to initiate a switching operation. Another cam 29 on the shaft 22 operates to close a contact 31 and complete a circuit to a signal lamp 32 when the indicator has made a predetermined number of steps from its zero position to thus inform the attendant that a corresponding predetermined number of unswitched messages are stored in the storage tape 2.

A pair of manually operable keys 33 and 34 are provided for completing circuits to the "add" and "subtract" magnets 21 and 23, respectively, so that the indicator may be reset manually should it get out of step for any reason. The operation of either one of these keys will add or subtract one message for each operation from that indicated by the setting of the message waiting indicator. A pointer 36 on the shaft 22 may co-operate with a dial 37 to visually indicate the number of complete unswitched messages in the storage tape 2.

In order that the last character of a message stored in the tape may reach the associated tape transmitter in the absence of succeeding messages, a tape feedout arangement is provided to feed blank tape out of the transmitter. The tape feedout operation is normally only initiated when the message waiting indicator 8 is in its zero position as it is not necessary to feed blank tape between messages immediately following one another. As set forth, relay RAC-3 is operated by the second period of the end-of-message signal and through its outer left hand tongue completes a circuit from potential through the coil of relay RADR to the right hand element of contacts 28. If the message waiting indicator is at this time in its zero position, as it will be if the associated message is the only one stored in the tape since the "add" magnet 21 will not at this time have operated to advance the shaft 22, the above circuit will be completed to ground through the movable element of contacts 28. Accordingly relay RADR will be energized and locked up to ground through its inner left hand tongue. Obviously with the message waiting indicator 8 in any other but its zero position, relay RADR will not be energized in conjunction with the receipt of an end-of-message signal. The energization of relay RADR through its outer tongue applies ground to a circuit extending through a back contact of relay RAFS to the timing network 38 associated with a vacuum tube 39. The above ground is also applied through a back contact of a feedout stop relay 41 and the coil of a power trip relay 42 to potential to operate the same. The operation of the power trip relay 42 initiates the reperforator into a tape feedout operation and the ground applied to the timing network 38 starts the charging of a condenser 43 therein through an associated resistor. After a predetermined length of time the condenser 43 is sufficiently charged, the tube 39 ionizes permitting current to flow and operate the feedout stop relay 41 in the tube circuit. As relay 41 operates, it opens the circuit to the power tripping relay 42 and thereby stops further tape feeding of the reperforator. The timing of the feedout operation is such that sufficient tape will be fed out of the reperforator to permit the last received message to completely pass through the associated transmitter 3.

If the reperforator 1 should start to receive another message during a tape feedout operation, the tape feedout is automatically stopped and the reperforator proceeds to store the message. During normal idle closed line condition of the line, the signal relay 17 is held energized and receipt of the first character of a message causes the signal relay to release due to the spacing pulses contained in the first character. As the signal relay 17 releases, the inner tongue thereof completes a circuit for the energization of relay RAFS to operate the same, which locks up through its right hand tongue. As relay RAFS operates, its left hand tongue opens a circuit to the power trip relay 42 which thereupon releases and stops further feedout of blank tape. As the signal relay 17 releases it also applies negative battery to both sides of the condenser 43 to quickly discharge the same and restore the timing circuit to its normal condition in readiness for another feedout operation.

Since the first character of the new message in accordance with operating routine will not be a period, contacts 19 will open and interrupt the locking circuit to relay RAC-3. Relay RAC-3 thereupon releases and opens the locking circuit through relay RADR which also releases. The latter relay in releasing through its outer tongue opens the locking circuit through relay RAFS whereupon it releases. Thus the two period counting relay chain and the tape feedout relays are restored to their normal condition and are again in readiness to read the next end-of-message signal consisting of two periods and to cause the tape feedout operation.

It sometimes happens that the last message of a group of messages is switched and there is no succeeding message whereupon it is necessary to obtain a tape feedout from the reperforator in order that the last character of the switched message will pass through the transmitter 3. Such a condition will prevail when the message waiting indicator 8 is indicating one unswitched message and relay RAC-3 is in an operated condition due to the two period termination of the last received message. The completion of the intraoffice transmission path and the switching of this message will cause the message waiting indicator to return to its zero position. This operation of the message waiting indicator will move the tongue of contacts 28 to its right hand position to complete a circuit through the coil of relay RADR and a front contact of relay RAC-3. Relay RADR thereupon operates and initiates a tape feedout operation in the manner set forth above.

It may happen at times that the last received message by the reperforator 1 for a time is very short and the tape containing the same is not of sufficient length to permit the last character of the preceding message to pass through the intraoffice transmitter 3. When this condition prevails, relay RAC-3 will be operated due to the two periods terminating the last message, and at such time during the transmission of the next to the last message the taut tape condition might occur before the next to the last message has been completely transmitted. The taut tape condition between the reperforator 1 and the tape transmitter 3 would cause the tape lever 46, Fig. 4, associated with the tape loop to operate its associated tape lever contacts 47 and 48. In other than a taut tape condition, tape lever contacts 47 are closed and tape lever contacts 48 open. Accordingly the taut tape condition closing contacts 48 applies a ground through the coil of relay RADR to negative potential at a front contact of relay RAC-3. Relay RADR thereupon operates and initiates a tape feedout operation by the printer perforator 1 in the manner set forth above. This tape feedout permits the next to the last message to pass through the tape transmitter 3 and provides sufficient blank tape to permit the last received message to pass through the transmitter 3.

*Establishing intraoffice transmission paths*

The operation of the equipment and circuits involved in the establishment of a transmission path will now be described and for the most part this equipment and circuits are found in Figs. 4, 5, 6, 7 and 8 of the drawings. In this connection it will be assumed that at least one complete message with its end-of-message signal is stored in the tape 2 and that preceding the message are destination indicating characters which indicate the destination to which the message is to be transmitted. Since there may have been an automatic tape feedout from the printer perforator preceding the storage of the message currently in the storage tape, the blank tape resulting from a feedout operation must be advanced through the transmitter 3 before the directing characters can be detected. It also sometimes happens that the operator in appending the end-of-message signal to the message may add one or more period characters and the transmitter 3 is arranged to idle therethrough the extra period characters as well as any blanks or message separating characters.

The transmitter idling step pulse for idling such characters through the transmitter originates at continuously operating contacts 51, one terminal of which is grounded and the other of which extends through the back contact and inner left hand tongue of relay TASC, the back contact and second left hand tongue of relay TARA, the back contact and right hand tongue of relay TARC, conductor 52, the back contact and inner right hand tongue of relay TAHR, conductor 53, tape lever operated contacts 47, which will be closed when a tape loop exists between the printer-perforator 1 and tape transmitter 3, the normally closed contacts of the tape push button 54 and the coil of the step magnet SM of transmitter 3 to potential. Thus for each closing of the contacts 51 the step magnet will be energized and advance the tape 2 one step in conjunction therewith.

The marking bus bar M of the tape transmitter 3 is grounded and the five movable tongues thereof are connected to the first five tongues of relay TAXC, and with relay TAXC deenergized the circuits from the first, second, third and fifth of these tongues extend through resistances 56 and the coil of relay TARC to potential. Thus, as long as a blank (all spacing) or a period (fourth marking) is stepped into association with the sensing elements of the transmitter, relay TARC will not be energized. However, when any other character but a blank or period, which in accordance with operating routine will be the first of a directing character, is advanced over the pins of a transmitter, one more of the tongues thereof will contact the grounded marking bus bar and establish a circuit for the operation of relay TARC. The idling step circuit, as described, passes through a back contact of relay TARC and hence its operation will interrupt the step circuit and cause the transmitter to come to rest with the first directing character over the feeler pins.

The operation of relay TARC establishes a request for an automatic switching unit. The circuits and apparatus of the automatic switching unit are shown principally in Figs. 9 to 14, inclusive, and its operation will hereinafter be described in detail. Since the automatic switching unit is operative only during the establishment of the desired intraoffice transmission path, it is arranged to serve a number of intraoffice transmitters, for example, 12. The automatic switching unit is provided with two 10-level rotary switches which function to connect it to the intraoffice transmitter having a message to be switched and when connected it functions to connect the intraoffice transmitter requesting the same to the proper intraoffice transmitting circuit or path as determined by the selecting characters preceding the message.

In connection with the operation of relay TARC to request connection to the automatic switching unit, relay TARA is operated. The circuit for operating the latter relay may be traced from potential through the left hand coil thereof, the second right hand tongue and back contact of relay TANS, the third right hand tongue and back contact of relay TASC, conductor 56, the back contact and outer left hand tongue of relay TAWC, conductor 57, the tongue and left hand element of contact 27 of the message waiting unit, conductor 68, the front contact and left hand tongue of relay TARC, conductor 59, contacts 61 and 62 of the reset switch 63, conductor 64, and through the home contacts and wipers of the B and A levels of the X switch, Fig. 5, to ground. It will be noted that the above circuit for operating relay TARA requires that the request connection relay TARC be operated by a character being over the pins of the transmitter and that the message waiting indicator be off its zero position indicating that there is at least one complete message in the tape waiting to be switched.

When relay TARA operates, its right hand tongue removes ground from the associated transmitter's point on the K level of the first selector switch 66 from the automatic switching unit. This ground originates at the contacts 67 of the busying switch 68 and extends through the inner left hand tongue and back contact of relay TANS. As the ground is removed from the associated point of the K level of the first selector switch 66, it is applied to the start circuit or conductor 71 for the first and second selector switches 66 and 69 which is common to all of the intraoffice transmitters served by the automatic switching unit. The start circuit includes the left hand front contact of normally operated relay ASC, the inner tongue and back contact of relay TOR-1 included in an electronic timer 72 and the coil of relay ASR to potential. Thus the operation of relay TARA under the above conditions causes relay ASR to operate.

Included in the automatic switching unit of Figs. 9 to 14 is a director switch, indicated generally by reference numeral 73, comprising a multiple level 25 point rotary switch which directs the operations of the switching unit in automatically switching a message. It is necessary that the director switch 73 be at a home position before the automatic switching unit makes a connection to an intraoffice transmitter. To this end the circuit for relay ASC is carried through the home points, No. 1 and No. 11, of the first level so that relay ASC is operated only when the director switch is at a home position.

As relay ASC is assumed to be operated, relay ASR will operate and through its left hand tongue establish a circuit from battery through the step magnet SM of the first selector switch 66, through resistance 74 in parallel with back contacts of relay ACC-1, the left hand contacts of relay ASR, to the wiper of the K level of the first selector switch. It will be noted that one side of the winding of relay ACC-1 is connected to ground and the other side of this winding is connected to the K level wiper of the first selector switch. If the K wiper is setting on a point which is grounded, indicating that the associated intraoffice transmitter is not requesting the automatic switching unit, a circuit is established to energize the step magnet SM. However, relay ACC-1 does not become energized at this time because the ground to the K level wiper short-circuits this relay. As the step magnet SM becomes energized it opens its contacts to interrupt its own circuit whereupon the magnet deenergizes and advances the selector switch wipers to their next point. If this point on the K level is grounded, the step magnet is re-energized and then deenergized to again advance the wipers. Such operation of the step magnet SM continues until the K level wiper reaches an ungrounded point representing the intraoffice transmitter requesting a connection, and when this occurs the step magnet circuit will be extended from battery through the step magnet, the left hand contacts of relay ASR, through the coil of relay ACC-1 to ground. Relay ACC-1 will thereupon operate but the current flowing through this circuit is limited to a value below that required to operate the step magnet SM.

When relay ACC-1 operates, it indicates that the first selector switch 66 is connected to the intraoffice transmitter which made the request for the automatic switching unit. It is now necessary to advance the wipers of the second selector switch 69 to the corresponding set of points to which the same intraoffice transmitter is connected. As relay ACC-1 operates, its outer left hand tongue connects ground to the wiper of the J level of the first selector switch 66 through the No. 7 conductor of cable 76, the right hand winding of relay TARA of the transmitter circuit to which the first selector is at this time connected, and over conductor 77 to a point on the K level of the second selector switch 69 that is associated with the same intraoffice transmitter. The K level second selector switch is thus marked and indicates the point to which the second selector switch should be stepped.

Simultaneously the operation of relay ACC-1 through its second right hand tongue applies ground to conductor 78, through back contacts of relay APS and coil of step magnet SM of the second selector switch 69 to potential. The step magnet SM is thereby energized and through its interrupter switch completes a circuit through the left hand coil of relay APS causing the latter to be energized. As relay APS energizes it interrupts the circuit of the step magnet SM and in conjunction with the deenergization thereof the wipers of the second selector switch 69 are advanced to the next point. Such energization and deenergization of the step magnet SM continue until the K level wiper reaches the marked or grounded point and when this occurs the ground at this point is extended through the K level wiper, the right hand coil of relay APS, conductor 79, the front contact and inner right hand tongue of relay ACC-1 and through the coil of relay ACC-2 to potential. Relays APS and ACC-2 are thereby energized and with relay APS energized the circuit to the step magnet SM of the second selector switch is permanently interrupted and no further advancement of the wipers thereof will occur. The operation of relay ACC-2 indicates that the wipers of second selector switch 69 are now resting on the points associated with the same intraoffice transmitter as those of the first selector switch 66.

It sometimes happens that a message is prepared with improper selecting characters, and the operator may detect this condition before the complete message has been perforated, as for example, after a few of the first characters have been perforated. To correct this condition, the operator may by back-stepping the tape in the perforator erase the erroneous perforations by perforating the tape with so-called rub-outs or letters shift codes which contain all-marking impulses. In such cases the intraoffice transmitter will idle the tape until such a rub-out appears over the sensing pins and then make a request for the automatic switching unit in the manner pointed out above. Now the character of the perforation over the pins of the transmitter will not be a message directing character and to take care of this situation the automatic switching unit is arranged to cause the intraoffice transmitter to step the rub-out characters through the intraoffice transmitter 3 and continue stepping such characters within a predetermined number until the first message directing character is detected which will have at least one impulse thereof spacing as distinguished from all-marking rub-out characters.

Before describing the manner in which the rub-outs are advanced through the intraoffice transmitter 3, the operation of the automatic switching unit incident to the energization of relay ACC-2 will be described. When the relay ACC-2 operates, its right hand tongue completes a circuit from the continuously operating contacts 81, one side of which are grounded, to the No. 1 point on the second level of the director switch 73. This is a home position of the director switch and with the wiper contacting this point, the above circuit is extended through the coil of the director switch step magnet SM to potential. Accordingly the step magnet is energized and the wipers of the director switch 73 stepped to their No. 2 position. With the director switch in this position a circuit is completed from ground through the outer tongue and back contact of relay AMS, wiper and No. 2 point of the first level of the director switch, conductor 82, and through the coil of relay 1LP to potential. Relay 1LP is thereby operated and completes five individual circuits from positive potential through the coils of five storing relays 1L1 to 1L5 to the plates of five vacuum tubes 83a, b, c, d, and e. The grids of the five vacuum tubes 83 are connected to wipers A to E of the first selector switch 66 and with these wipers on the points associated with the intraoffice transmitter making the request for the automatic switching unit, the grid circuits are extended through the first five conductors of cable 76 and first five back contacts and tongues of relay TAXC to the tongues of the intraoffice transmitter 3. With a tongue of the transmitter 3 spacing, negative potential from the source 70 through one of the resistances 75 is applied to the grid of its corresponding vacuum tube 83 and no plate current will flow therethrough. However, with a tongue of the transmitter marking, ground is applied to the grid of the associated vacuum tube and plate current will flow to operate its associated 1L relay. Thus relays 1L1 to 1L5 are operated in accordance with the position of the tongues of the transmitter 3, with marking pulses causing the corresponding 1L relays to be energized and spacing pulses causing the 1L associated relays to be deenergized.

When the character over the pins of the transmitter 3 is a letters shift, all five relays 1L1 to 1L5 will be energized and complete a circuit from ground through the inner right hand tongues of these relays and the right hand coil of relay ALS to potential, whereby the latter relay is energized. Such operation of relay ALS indicates that the character over the transmitter pins is not the first message directing character and that it should be stepped out of the transmitter. This function of relay ALS is accomplished by the right hand tongue extending the circuit from the contacts 81 through the left hand coil of relay ALS, the F wiper of the first selector switch 66, the ninth conductor of cable 76, the inner left hand contact and tongue of relay TARA, conductor 53, and a previously described circuit through the step magnet SM of the transmitter. Accordingly the next pulse from contacts 81 will energize the step magnet and cause the character therein, which under the assumed conditions is a letters character, to be stepped out of association with the pins. Simultaneously the operation of relay ALS through its left hand tongue opens all the locking circuits for relays 1L1 to 1L5 and in conjunction therewith the application of negative potential to the grids of the five vacuum tubes 83 will permit the relay 1L1 to release. The negative potential is applied to the grids of the five vacuum tubes incident to the stepping of the all-marking letters shift character through the transmitter as the tongues are all spacing during a stepping operation. After relays 1L1 to 1L5 release, the circuit through the right hand coil of relay ALS is interrupted; however, it remains energized as long as the stepping pulses of contacts 81 flow through its other winding and at the end of the stepping pulse relay ALS become deenergized. The deenergization of the transmitter step magnet SM incident to the advancing of a letters character therethrough advances the following character into the transmitter and it is similarly set up on the storing relays 1L1 to 1L5. If this character is also a letters shift, the same procedure is followed and it is likewise stepped through the transmitter, and such procedure continues until a character other than a letters shift character is advanced into the transmitter. Each time relay ALS is operated due to a letters shift character, its right hand tongue opens the circuit to the No. 2 point of the second level of the director switch 73 so that the step magnet will not be energized and the wipers thereof will remain in their No. 2 position.

*Storing the selecting characters*

In the described embodiment of the invention two selecting or message directing characters are employed to control the automatic switching unit in establishing the intraoffice transmission path to the desired sending position. Obviously with only a few sending positions, one directing character could be used and should the number of sending positions be increased, more directing characters could be employed to direct the automatic switching function.

It will be assumed in the following description that the two message directing characters preceding the message in the tape 2 are =P. Incident to the switching operation these two characters are stored on storing relays. As pointed out above, blank tape, period characters or letters shift characters are advanced through the transmitter 3 until the first selection character reaches the pins thereof. Since this character is assumed to be "=" with the second pulse marking only, only relay 1L2 of the storing relays 1L1 to 1L5 will be operated since for the present condition of the automatic switching unit these relays are connected to the tongues of the transmitter 3. When relay 1L2 operates, its left hand tongue establishes a locking circuit therefor through a back contact of relay ALS and a front contact of relay ACC-1. Following the storing of the first character on the relays 1L1 to 1L5, the contacts 81 close and establish a circuit through the right hand tongue and back contact of relay ALS to the No. 2 point of the second level of the director switch 73. This causes the director switch to step to its third position whereupon the wiper of the first level of the director switch opens the circuit through the coil of relay 1LP to release it. As the wiper of the first level of the director switch advances to its third point, a circuit is completed from the grounded tongue of the wiper, conductor 86, through the coil of relay A6P, whereupon it becomes energized. The operation of relay A6P applies a ground through the F wiper of the first selector switch 66 to the step circuit of the transmitter 3 causing the step magnet thereof to be energized.

The third to the eighth points on the second level of the director switch 73 are connected directly to the pulsing contacts 81 and hence with the wiper on the No. 3 point, the step magnet SM of the director switch will be energized on the next closing of the contacts 81.

With the circuits of the automatic switching unit in the above condition, the next closure of the contacts 81 applies ground through the third point of the second level of the director switch 73 to the step magnet SM whereby the director switch is advanced to its fourth position. This operation opens the circuit through the wiper of the first level and the A6P relay which releases and thereby removes the ground from the circuit to the step magnet of the transmitter 3. This causes the transmitter to advance the second selection or directing character into association with the sensing pins thereof.

Subsequently, the contacts 81 again close to advance the wipers of the director switch 73 into their fifth position and at this time ground on the tongue of the first level is applied over conductor 87, through the coil of relay 2Lp to battery. The latter relay thereupon operates and connects the coils of the second set of reading relays 2L1 to 2L5 to the plates of respective vacuum tubes 83a to 83e. At this time the character P having the second, third and fifth pulses thereof marking is being sensed by the pins of the intraoffice transmitter 3 and through the above described circuits will cause vacuum tubes 83b, 83c and 83e to be conductive. Consequently, the transfer of this character to a second set of storing relays 2L1 to 2L5 results in the second, third and fifth of these relays being operated and the other two unoperated. The first four of the second set of reading relays have companion relays which operate in conjunction therewith. These companion relays are identified by reference numerals 2LA1 to 2LA4. Accordingly, with the character P stored in the second set of storing relays 2L1 to 2L5, relays 2LA2 and 2LA3 will also be operated. The operated ones of the second set of relays are locked up by circuits through their left hand tongues and front contacts and the outer right hand tongue of relay ACC-1.

Following the storing of the second selecting character in the second set of storing relays, the next closure of the contacts 81 will step the director switch 73 to its sixth position and during this operation open the circuit to relay 2LP which thereupon releases. In conjunction with the above operation, the wiper of the first level of the director switch again completes a circuit for the operation of relay A6P which applies ground to the circuit of the transmitter step magnet to energize the same.

Following this operation, the next closure of the contacts 81 steps the director switch into its seventh position wherein the circuit to relay A6P is opened which thereupon releases and removes ground from the transmitter step magnet circuit. The transmitter step magnet thereupon releases and advances the second selecting or message directing character out of the transmitter and places the following space character over the transmitter pins, since in accordance with operating routine a selecting or directing character preceding a message is invariably followed by a space character. The next closure of the contacts 81 advances the director switch 73 to its eighth position to again complete a circuit for relay A6P which as before causes energization of the transmitter step magnet. The next operation of the director switch 73 opens the circuit to relay A6P which in turn opens the transmitter step magnet circuit to step the space character through the transmitter and the following character B into association with the feeler pins. The director switch 73 is now in its ninth position and indicates that the two selecting characters have been stored and that an automatic switching operation should now take place.

Figure 14:
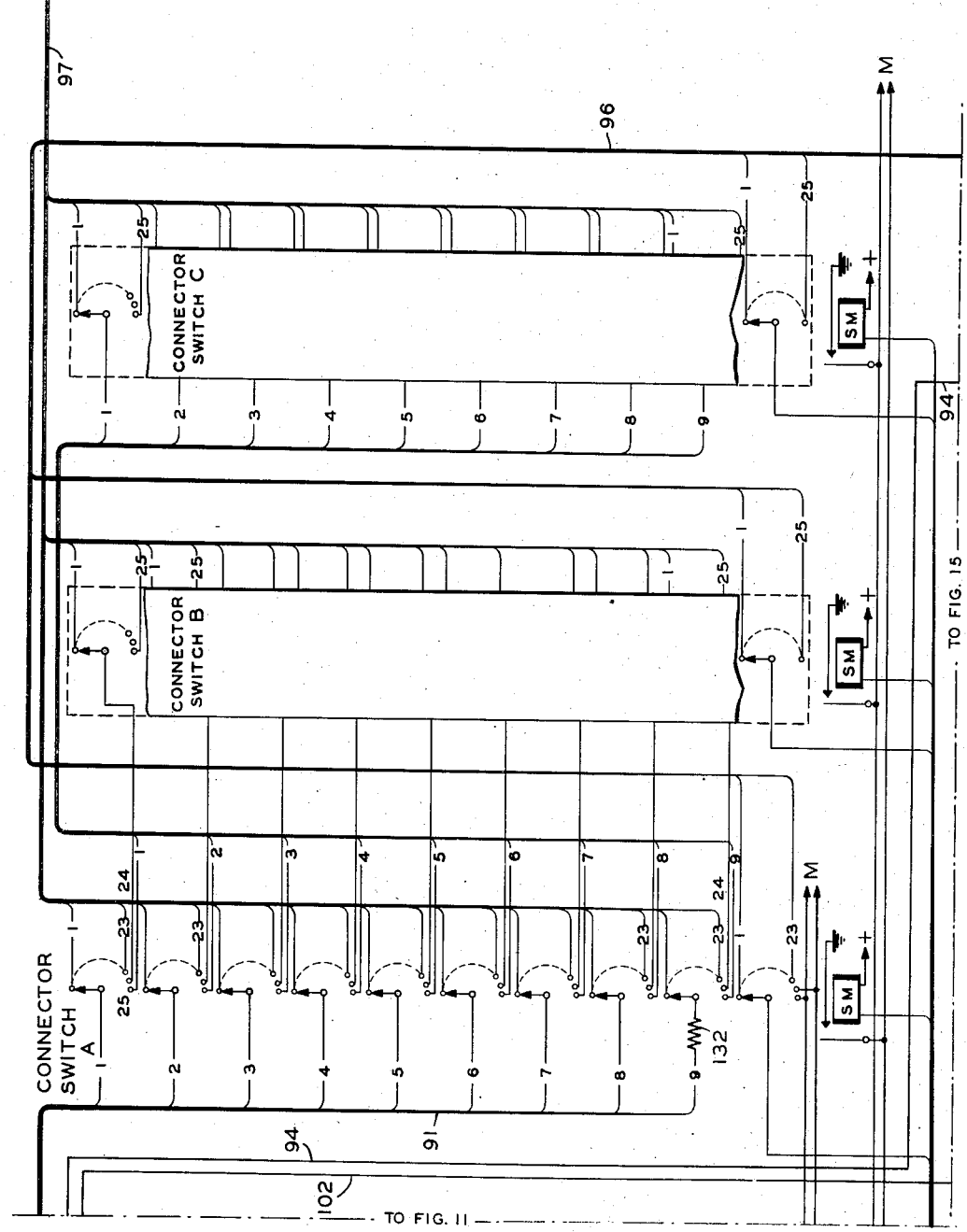

Before describing an automatic switching operation, the switching equipment will be described in general. This equipment consists primarily of three so-called connector switches designated A, B and C, Fig. 14, for each transmitter circuit, and there are twelve of these sets of connector switches controlled by the automatic switching unit. As shown in Fig. 14, the nine conductors of cable 91 from the intraoffice transmitter circuit terminate on the first nine wipers of the ten-level, 25 point connector switch A. The first twenty-three points of these nine levels extend to twenty-three intraoffice circuits. The twenty-fourth set of the points of the A switch is connected to the wipers of B switch, and the twenty-fifth set of points of the A switch is connected to the wipers of the C switch. The sets of points of each of the B and C switches are connected to twenty-five intraoffice circuits. Thus, this arrangement permits an intraoffice transmitter to be connected to any one of seventy-three intraoffice circuits representing seventy-three destinations, and these intraoffice circuits are multipled to similar points on the connector switches associated with the other intraoffice transmitter circuits that may be provided in the switching center.

The actual call letters of the seventy-three destinations are used as the selecting characters and one-letter offices are preceded by the equals sign character in order that there always be two selection characters.

Figure 15:
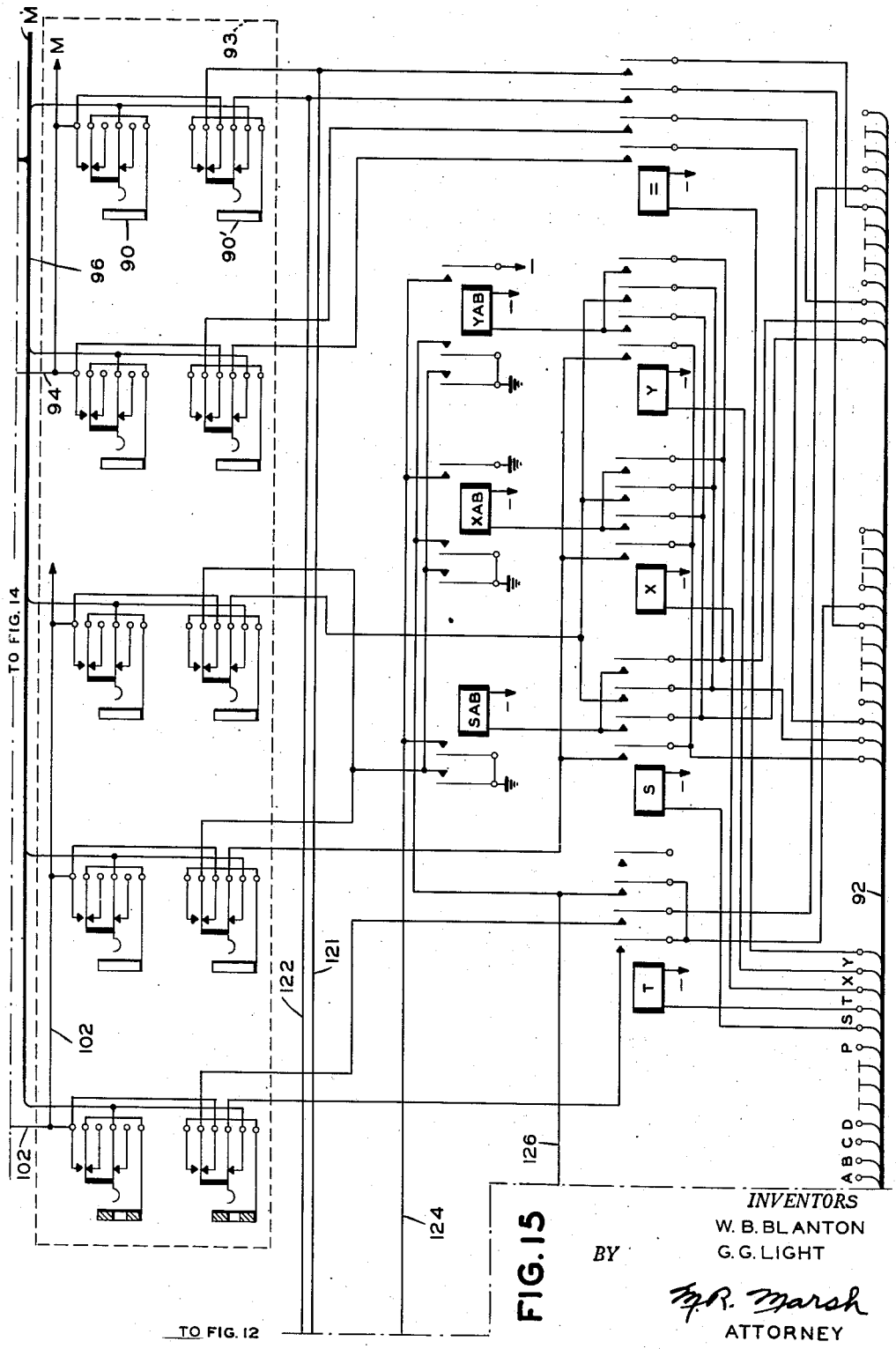

Selection characters, when stored, control a set of so-called office call relays, some of which are shown in Fig. 15 and identified by corresponding characters such as T, S, X, Y and equals sign. The coils of the office call relays, such as those identified, are connected by individual conductors of a cable 92 to the terminals of baffle circuits controlled by the relay groups 1L, 2L and 2LA. These baffle circuits are so arranged that any one of thirty-two possible circuits can be established and each corresponds to a character of functional code combination.

If it is assumed that the equals character and the P character are stored in the storing relays, the stepping of the director switch 73 to its ninth position applies a ground through its first level and the baffle circuit of relays 1L1 to 1L5 and a conductor of cable 92 through the equals office call relay to battery. The equals relay thereupon operates and its two outer tongues designated P, which are connected by cable 92 to corresponding terminals of the second set of storing relays 2L1 to 2L5 and a third set of relays 2LA1 to 2LA4, have circuits thereof extending to a pair of jacks such as 90 and 90' in a traffic routing board indicated generally by reference numeral 93.

Figure 11:
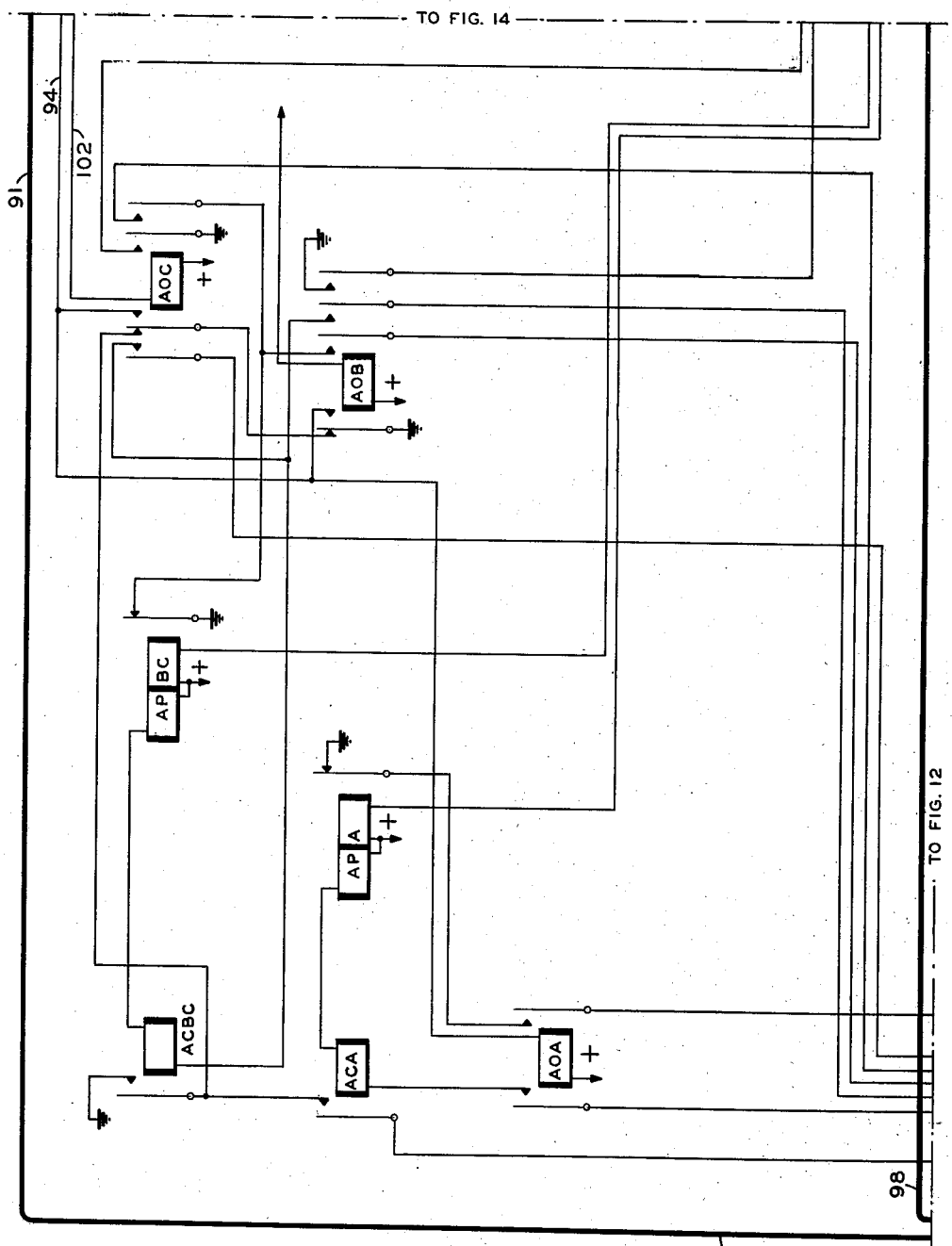
Figure 12:
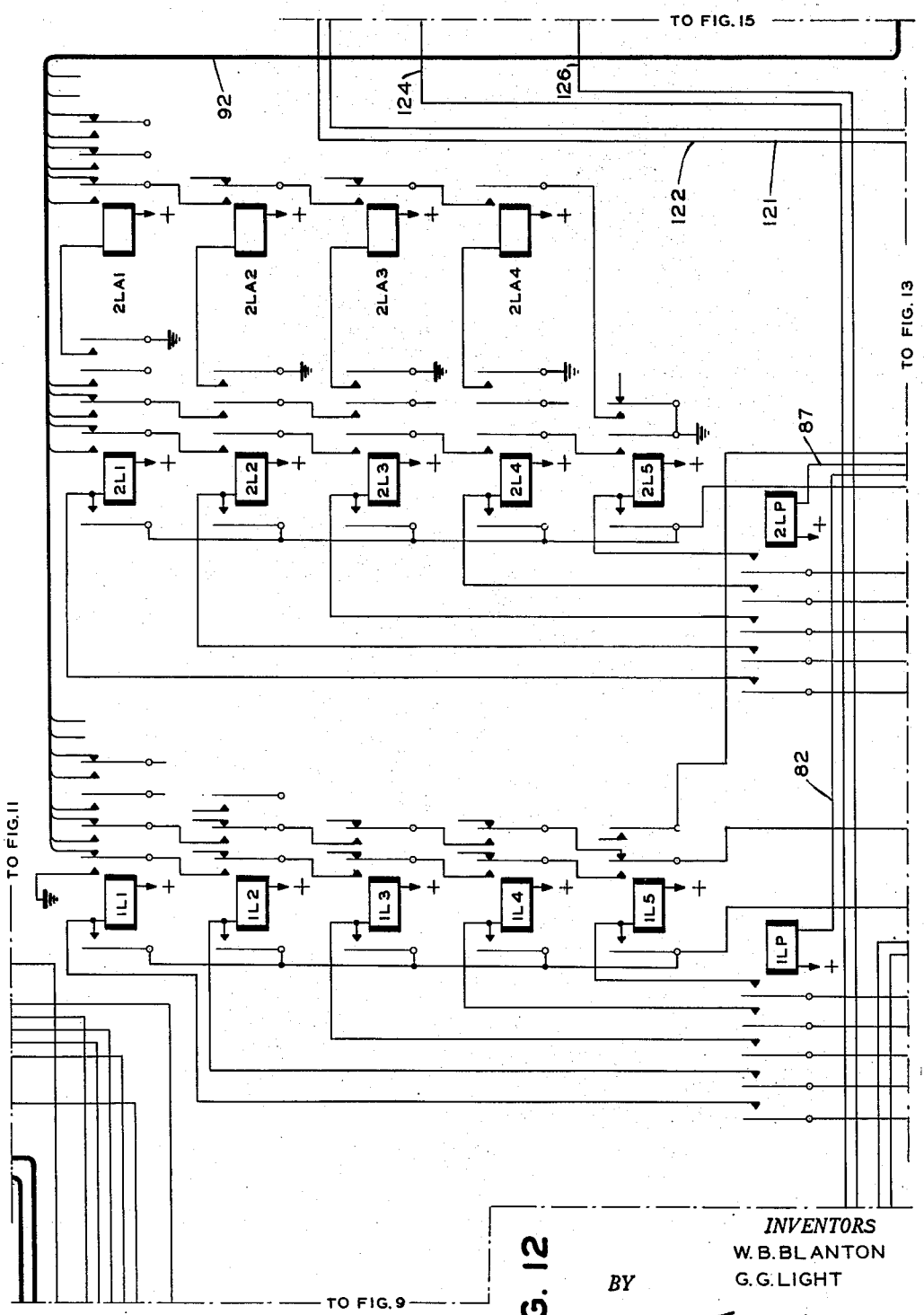

The front contact of the outer tongue of the equals relay extends through the contacts of the lower pair of jacks in the traffic routing board 93, and then by a conductor 94 through the coil of relay AOA, Fig. 11, to potential. The front contact of the third tongue of the equals relay extends through a normal contact of the lower one of the pair of jacks and by an individual conductor of cable 96 to a representative point on the K level of the A connector switch.

As the equals relay operates, the circuit is completed for the operation of relay AOA and its operation signifies that the destination represented by the two stored selecting characters is on the A connector switch and the point on the K level of this switch that is marked by the application of the ground thereto indicates the position on the switch at which the desired intraoffice circuit is connected. At this position the nine cross-office conductors of the desired intraoffice circuit terminate on the A to J levels of the A connector switch and these conductors are a group of 9 of the cable 97. Other groups of 9 conductors each, representing other intraoffice circuits, terminate on the other sets of points on connector switches.

Relay AOA is mutipled, as indicated, to all the jacks in the traffic routing board that is associated with destinations appearing on the A connector switch. Similarly, relays AOB and AOC are multipled to all the jacks in the traffic routing board that are associated with destinations appearing on the B and C connector switches respectively.

*Operation of intraoffice connector switches*

The connector switches, such as A, B and C, Fig. 14, are stepped under the control of a set of step controlled relays, which includes primarily the relays shown in Fig. 11. When the second selector switch 69 was stepped to the points corresponding to the intraoffice transmitter circuit requesting a connection to the automatic switching unit, various circuits from the step control relays, Fig. 11, connected to the upper six wipers of the second selector switch 69, were extended by individual conductors of a cable 98 to the K level wipers and step magnets SM of the connector switches A, B and C, as indicated. The intraoffice connector switches A, B and C, thus connected to the wipers of the second selector switch 69, are the ones associated with the intraoffice transmitter having the message to be switched. Relay AOA, as pointed out above, is operated at this time and completes a circuit from ground through the tongue of relay APA, the right hand tongue of relay AOA, the F wiper and contact of the second selector switch 69, a conductor of cable 98 and through the step magnet SM of the A connector switch, to potential. The step magnet thereupon energizes and closes its associated interrupter springs and thereby establishes a circuit from ground through the right hand coil of relay APA, to potential. Relay APA thereupon operates and interrupts the above described circuit to the A connector switch step magnet, permitting it to become deenergized and effect advancement of its wipers. As the A connector switch steps its interrupter springs open and interrupts the circuit to relay APA which thereupon releases. The release of relay APA again applies ground to the step magnet circuit of connector switch A and such energization and deenergization of the step magnet continue until the wipers of the A connector switch are stepped to the grounded point on the K level thereof. When the wipers of the switch reach the grounded point, this ground is extended over a conductor of cable 98, the E wiper of the second selector switch 69, the left hand tongue and front contact of relay AOA, the coil of relay ACA and the left hand coil of relay APA to battery. The completion of this circuit maintains relay APA operated to prevent connector switch A from taking another step and operates relay ACA. The operation of relay ACA indicates that the A connector switch has reached the point marked by the ground applied through the baffle circuit of the 2L relays and the contacts on the equals office call relay of Fig. 15.

When the relay ACA operates, a circuit is established from ground through the left hand tongue and back contact of relay AOB, the inner left hand tongue and back contact of relay AOC, the front contacts of relay ACA, the G level of the second selector switch and thence by conductor 99, the coil of relay TASC of the intraoffice transmitter circuit, the back contact and outer right hand tongue of relay TAHR and through a resistance 101 to negative potential at 102. This circuit causes relay TASC to operate which locks up to ground through its inner right hand tongue. The automatic switching unit has now set up the intraoffice transmitter circuit to the desired intraoffice circuit. In other words, the intraoffice circuit by virtue of the operation of relay TASC is now conditioned to seize the intraoffice circuit if it is not busy at the moment or to seize the same when it becomes idle. The actual seizing operation will be described hereinafter.

*Release of automatic switching unit*

The operation of relay TASC initiates the release of the automatic switching unit to permit use there by the various other intraoffice transmitter circuits that may be associated therewith. As the relay TASC operates, its third right hand tongue opens the circuit through the left hand coil of relay TARA while its second right hand tongue shirt-circuits the right hand coil of relay TARA and thereby causes relay TARA to release and reapply the ground from the busying switch 68, through the left hand tongue and back contact of relay TANS, the right hand tongue and back contact of relay TARA, to the point on the K level of the No. 1 selector switch representing the calling intraoffice transmitter circuit. Since the K wiper of the first selector switch is at this time resting on this point, the ground will short-circuit the coil of relay ACC-1 thereby causing it to release. As relay ACC-1 releases, its first right hand tongue opens the circuit through the coil of relay ACC-2 and the right hand coil of relay APS permitting these two relays to release.

Relay ACC-1 in releasing opens the locking circuit through contacts of relay ALS and the coils of L1 storing relays, whereupon the operated ones of these relays release. Through its outer right hand tongue relay ACC-1 releases the operated ones of the 2L storing relays. As relay ACC-2 releases, its right hand tongue completes a circuit from the impulse unit 81 to the ninth and tenth point on the second level of the director switch 73 so that the director switch is caused to step to its eleventh or home position. Now, the automatic switching unit is conditioned to respond to a request from some other one of the intraoffice transmitters associated therewith.

If the desired intraoffice circuit was to be established through either the B or C connector switch, Fig. 14, the A connector switch would be stepped to either its 24th or 25th position and the corresponding connector switch B or C stepped to the position upon which the desired circuit appears. If, for example, a desired destination appeared on connector switch C, the proper office call relays similar to those shown in Fig. 15 would be operated to ground a pair of leads to jacks in the traffic routing board 93. One of these grounded circuits would be extended through the jacks to a common multiple 102 which extends through the coil of relay AOC to potential. The other one of the grounded circuits will extend over the conductor of cable 96 to a respective point on the K level of connector switch C. Thus relay AOC becomes operated and a point on the K level of connector switch C grounded or marked. As relay AOC operates, its inner right hand tongue grounds the 25th point on the K level of switch A and through its inner left hand tongue completes a circuit for the operation of relay AOA. As relay AOA operates, it functions as previously described to cause connector switch A to step until it reaches its grounded point which under the assumed conditions will be its 25th point, and the circuits through the first nine wipers of connector switch A are extended to the first nine wipers of connector switch C.

Simu'taneously with the stepping of the A connector switch, circuits are completed for the stepping of the C connector switch through the operation of relay AOC. Relay APBC controls the operation and stepping of connector switch C in the same manner as relay APA functions as previously described to control the stepping of connector switch A. Also, relay ACBC operates when connector switch C reaches the marked point in the same manner that relay ACA opérates when connector switch A steps to its grounded point.

When the two connector switches such as A and C involving a switching operation reach their respective grounds or marked points, as signified by operation of relay ACBC, a circuit is established through the front contacts of these two relays for the operation of relay TASC to signify that the connection has been established to the desired intraoffice circuit and initiate the release of the automatic switching unit in the manner pointed out.

Figure 13:
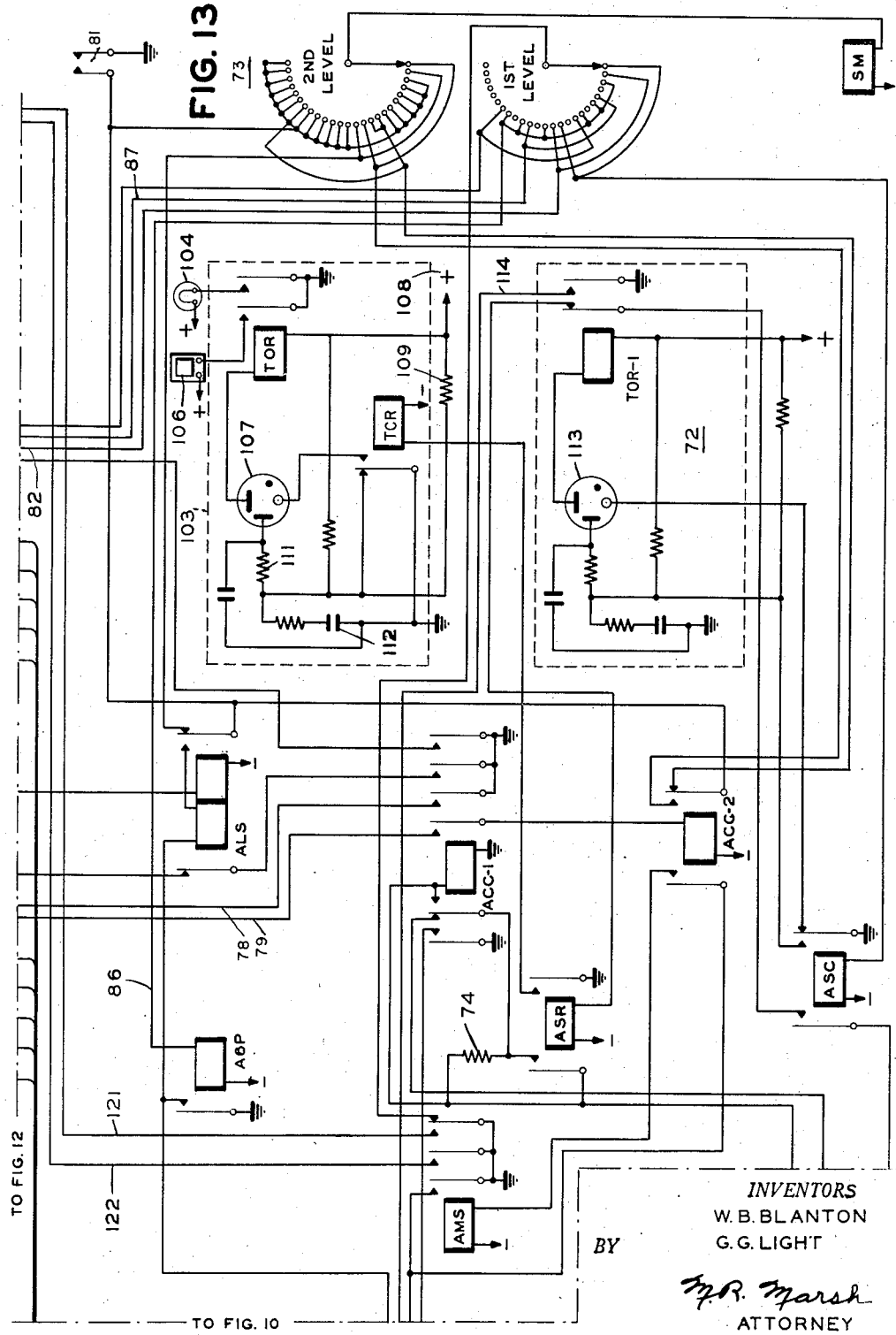

*Selector switch tieup alarm*

Where a number of independent circuits, such as intraoffice transmitter circuits, are associated with a single piece of equipment such as the automatic switching unit, it is necessary that an attendant be notified if for some reason the switching unit is prevented from properly operating. To accomplish this an electronic timer indicated generally by reference numeral 103, Fig. 13, is employed, and functions to operate both a visual alarm such as a light 104 and an audible signal such as a buzzer 106 if the automatic switching unit does not connect to an intraoffice transmitter within a predetermined time such, for example, as one to two seconds after the operation of the start relay ASR. As pointed out, relay ASR operates if one or more intraoffice transmitters are making a request to the automatic switching unit and if relay ASC is in the operated condition. Relay ASC will be operated when the automatic switching unit is idle and the director switch 73 is on one of its home positions, such as the first or eleventh.

Figure 9:
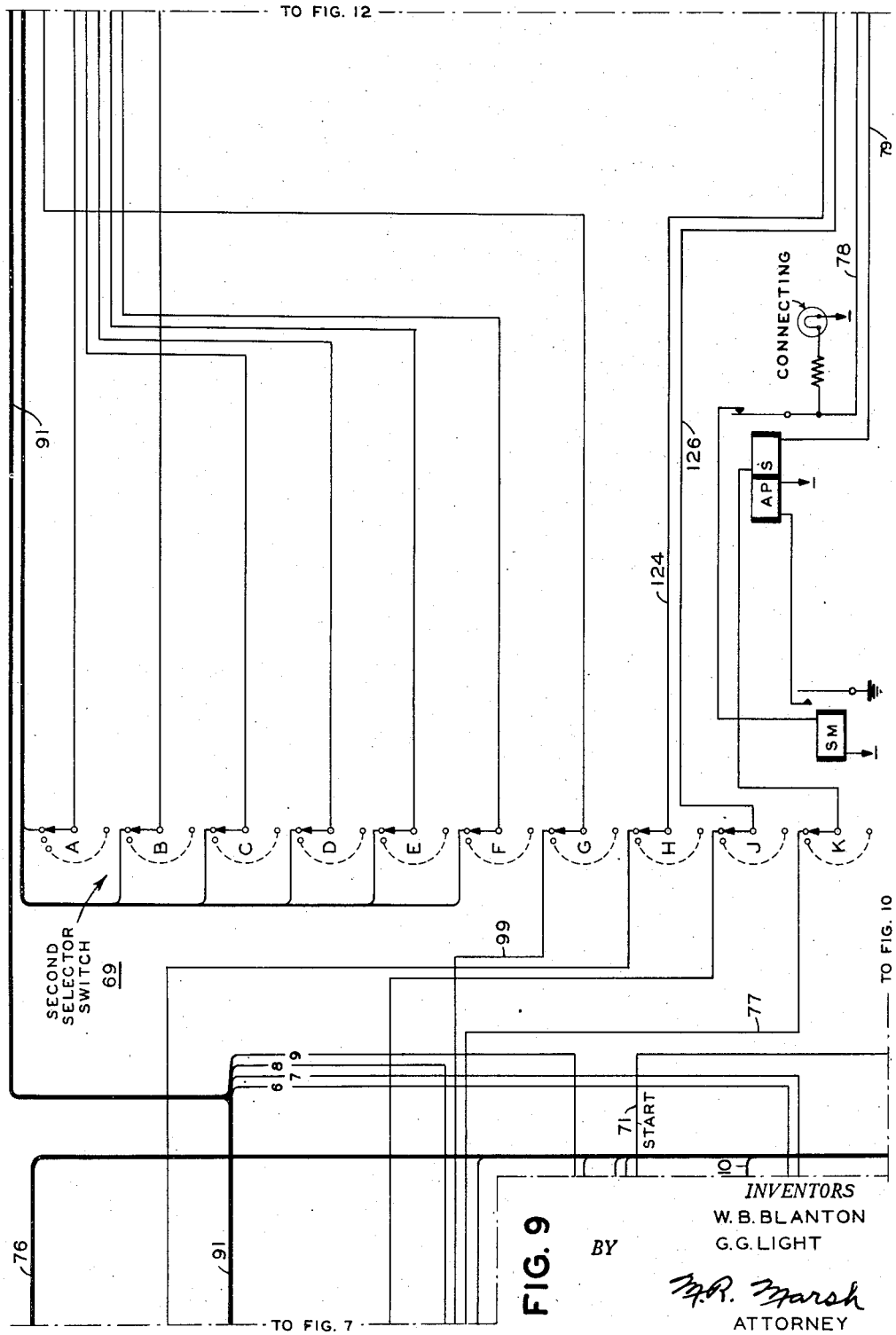
Figure 10:
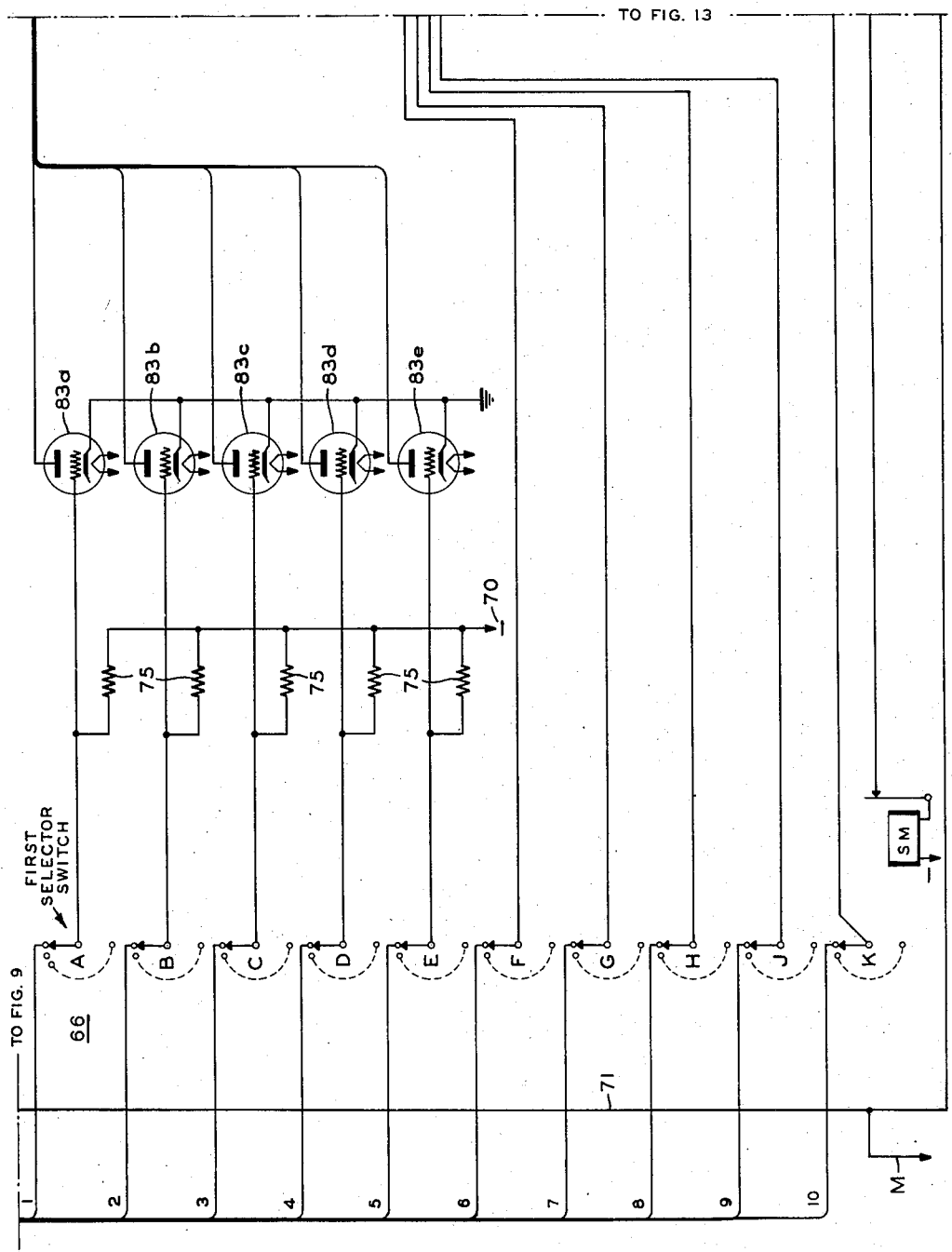

When relay ASR operates, its left-hand tongue initiates the selector switches 66 and 69, Figs. 10 and 9, respectively, to seek the intraoffice transmitter making the request for a connection. Simultaneously, right-hand tongue of relay ASR completes a circuit for the operation of relay TCR in the timer 103. The operation of relay TCR removes the ground on the starter anode of tube 107 and applies the ground to the cathode element. This leaves the starter anode circuit in the condition where positive battery from the source 108 is applicable through resistances 109 and 111 to the anode in parallel with a condenser 112, the other side of which is grounded. If relay TCR remains operated long enough for condenser 112 to become charged to approximately 85 v., the tube 107 will ionize. Thereupon relay TOR will operate to complete circuits to the lamp 104 and the buzzer 106.

Normally the automatic switching unit will make the desired connection before relay TOR operates and when relay ASR operates it causes the two selector switches to be connected to the intraoffice transmitter making the request for a connection. Incident thereto the director switch 73 steps off its home position. When this occurs the circuit of relay ASC is interrupted, which in turn causes relay ASR to be deenergized. As relay ASR releases it opens the circuit to relay TCR. Relay TCR in releasing places a ground on the starter anode of the tube 107 and removes the ground from the cathode circuit. At this time the condenser 112 is grounded at both of its terminals through an associated resistance and will therefore become discharged.

No-switch indicating circuit

It sometimes happens that an intraoffice circuit, after being connected to the automatic switching unit, does not have an intraoffice circuit established therefrom for one reason or another, such as improper selection characters or selection characters representing a destination for which there is no outlet. In such instances the automatic switching would not function and following a predetermined period of inaction, the switching unit is released from the position making the request and proceeds to handle requests from other positions associated therewith. This timing of the association of the automatic switching unit with a position making a request is controlled by the electronic timer 72, Fig. 13.

As pointed out, relay ASC is operated when the director switch 73 is on a home position and releases as soon as the director switch leaves a home position. With relay ASC energized, its right-hand tongue applies a ground to the starter anode of vacuum tube 113 and when this relay is deenergized this ground is applied to the cathode. This initiates operation of the timing circuit which functions in a manner similar to that of the electronic timer 103. If relay ASC remains deenergized for a period exceeding four to five seconds, a period normally greater than that required for the automatic switching unit to store the selection characters and make an automatic switch, tube 113 will ionize and cause operation of relay TOR-1.

Figure 7:
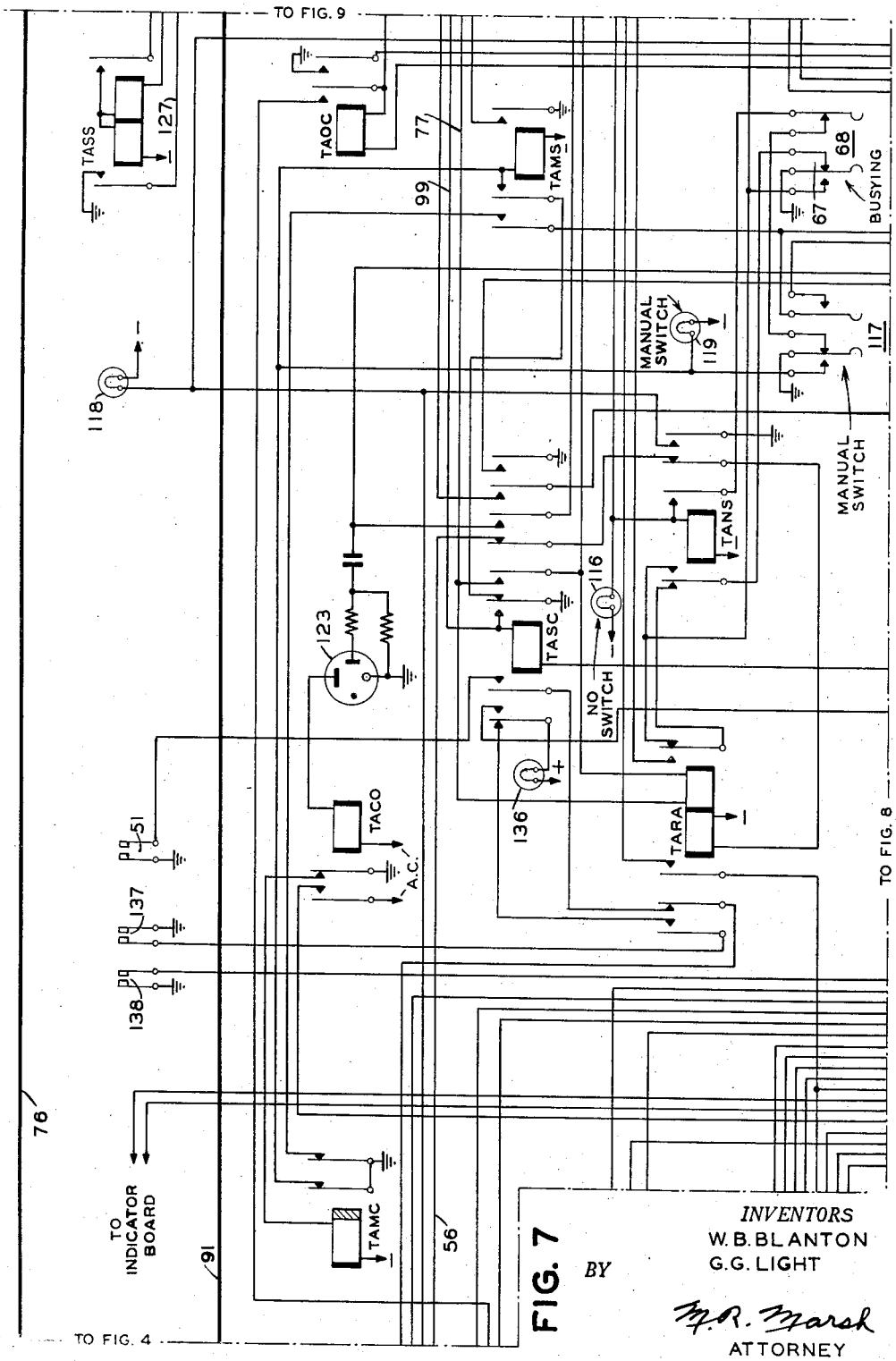

If relay TOR-1 should operate, its outer tongue applies a ground over conductor 114, through the G wiper of selector switch 66, the No. 8 conductor of cable 76, and through the coil of relay TANS, Fig. 7, and parallel with a no-switch lamp 116 to potential to cause relay TANS to operate and the no-switch lamp 116 to glow. Relay TANS locks up by a circuit through contacts including its inner right-hand tongue and normally closed contacts of the busying switch 68 and the switch 117, to ground. The operation of relay TANS also through its left-hand tongue applies a ground from contacts 67 of the busying switch 68 over conductor No. 19 of cable 76 to the K level point on which the wipers of selector switch 66 are resting. This ground short-circuits relay ACC-1 of the automatic switching unit causing it to release and open the circuit to relay ACC-2 which in turn releases. The automatic switching unit thereupon functions in a manner similar to that pointed out above, wherein its operation was described in connection with the completion of an automatic switch. Thus the automatic switching unit is disconnected from the intraoffice transmitter position from which it can not complete a switching operation and the director switch 73 steps to a home position, the latter causes relay ASC to become energized and removed the ground from the cathode of tube 113 whereupon it causes relay TOR-1 to release. The operation of relay TOR-1 as described opened the start circuit and the deenergization thereof restores this circuit so that the automatic switching unit will be ready to make connection to any of the other intraoffice transmitter positions making a request therefor.

The operation of relay TANS in the intraoffice transmitter position circuit holds that position inoperative until it is restored to service by an attendant. Relay TANS through its second right-hand tongue opens the circuit to the request relay TARA and through its outer right-hand tongue completes a circuit from ground for lighting a supervisory lamp 118. The lighting of the supervisory lamp 118, which may be common to a number of transmitter positions, informs the attendant of a no-switch situation and the individual no-switch lamp 116 indicates the particular transmitter position involved. If the no-switch situation is the result of faulty equipment, the attendant may reset the transmitter tape and restore the transmitter position to an operative condition by momentary operating one of the switches 68 or 117 which open the locking circuit for relay TANS.

Selective switching sending position

In the arrangement disclosed, it is possible for the automatic switching mechanism to direct a message to any one of seventy-three intraoffice circuits or destinations. By the employment of more connector switches, such as A, B and C or switches having more terminals thereon, the number of intraoffice circuits, to which a connection could automatically be made, could be increased. However, it has been found that the seventy some intraoffice circuits accommodate the heavily loaded circuits comprising the bulk of the traffic and that it is more economical of equipment to manually switch to the lightly loaded outlets. In this connection, a message received at the intraoffice transmitter position and intended for a destination not having an associated point on one of the connector switches are directed to a so-called selective switching sending position where, by the use of manual switching means such as push buttons, the message is directed to its proper destination. For this purpose, one or more of the intraoffice circuits such as that represented by the twenty-third point on the A connector switch extends to a selective switching sending position and messages appearing at this position may be directed to their proper destination by push button controlled switching in the manner set forth in copending application Serial No. 240, filed January 2, 1948. The selective switching sending position at a switching office would normally send to the local lines radiating from the office and there may be more than one such selective switching sending position in a central office. Messages can be directed to the selective switching sending position by the automatic switching unit when such messages are preceded by the proper directing or selecting characters.

As set forth, the no-switch signal lamp 116 is lighted at an intraoffice transmitter position and calls this condition to the attention of the supervisor. If the supervisor finds that the no-switch was caused by faulty selection characters, the tape in the intraoffice transmitter may be reset so as to eliminate the selection characters and then by depressing the manual switch key 117, the message is switched to a selective switching sending position from where it can be transmitted to a push button position and then switched to its proper destination. The operation of the manual switch 117 completes a circuit through its left-hand contacts for the lighting of the manual switch lamp 119 and the operation of relay TAMS. This operation switch 117 also opens the lock circuit for relay TANS which releases. As relay TAMS operates, it locks up through a back contact of relay TASC and also applies a ground from its right-hand tongue over the No. 6 conductor of cable 76 to the point associated with this intraoffice transmitter on the H level of the first selector switch 66.

As relay TANS releases, it restores the intraoffice transmitter to an operative condition and if there is at this time a character over the transmitter pins and the message-waiting indicator is off its zero position, relay TARA will operate and thereby make a request for the automatic switching unit. In response to this request, this switching unit will respond and connect the intraoffice transmitter as in the manner previously described and after both selector switches 66 and 69 have made connection to the transmitter position relay ACC-2 will operate. The operation of relay ACC-2 will complete a circuit from the H wiper of the first selector switch for operating relay AMAS. The operation of relay AMS removes ground from the wiper of the first level of the director switch 73 and applies ground to a pair of conductors 121 and 122. Conductor 121 extends through one of the pair of jacks in the traffic routing board 93 to the multiple conductor 94, leading to the coiling of the AOA relay to potential, while conductor 122 extends through the same pair of jacks to one of the conductors of cable 96 to the twenty-third point on the K level of the A connector switch associated with the involved intraoffice transmitter. Thus, the two conductors 121 and 122 circumvent the circuits normally established through the storing relays of Fig. 12 and the office call relays of Fig. 15 to apply a ground on the A connector switch and initiate operation of the connector switch step control relays such as those of Fig. 11. During such operations, relay ACC-2 is operated to step the director switch 73 off its home position and the director switch continues to step until it arrives at its ninth position. However, the director switch does not perform any function such as storing characters or stepping the intraoffice transmitter because of the absence of a ground at this time on the wiper on the first level thereof.

When the manual switch 117 is operated, its right-hand set of contacts prepares a circuit for the operation of relay TASC and when this relay operates it opens the locking circuit for relay TAMS which releases and also extinguishes the manual switch lamp 119.

There may be occasions when a connection has been set up to a sending position and it is desired to abandon that connection and switch the message to a selective switching sending position. If the manual switch key 117 is operated before relay TAS-2 is operated, which is not operated until a private circuit has been completed to the sending position, the manual switch key will apply a ground to the battery circuit that extends through relay TASC. This will short-circuit relay TASC whereupon it will be released and thus disconnect the intraoffice transmitter from the sending position to be abandoned. The operation of relay TAMS will then cause the automatic switching unit to connect the intraoffice transmitter to the selective switching sending position.

*Close-out sending position*

As will be obvious in connection with the description of a sending position circuit, the operation of its close-out key will apply alternating current to the start circuit thereof. This start circuit is represented by the ninth conductor of a nine-wire group of cable 97 and will appear at a point on the ninth level of conductor switch A. With the connector switches attempting to establish a transmission path to the close-out sending position, this A. C. circuit will be extended over the ninth conductor of cable 91 and to the fourth right hand tongue of relay TASC. Thus, as relay TASC operates in the manner pointed out and attempts to establish the desired path, the alternating current is extended to the starter anode of tube 123. This will ionize tube 123 and cause operation of relay TACO in the plate circuit thereof, which in operating opens the circuit to the slow-to-release relay TAMC. Shortly thereafter normally operated slow-to-release relay TAMC releases and applies a ground to short-circuit the winding of relay TASC which deenergizes and disconnects the transmitter position from the close-out intraoffice circuit. The circuit short-circuiting the coil of TASC includes contacts of relays TAMS and TAHR. In the above manner, a new request is made for the automatic switching unit and when it makes connection to this intraoffice transmitter, the message will be switched to a selected switching sending position since relay TAMS is at this time operated.

*Supervisory notes*

Some of the intraoffice circuits represented by the nine-wire groups of cable 97, Fig. 14, may extend to so-called supervisory positions for receiving supervisory notes sent by outlying stations. These supervisory positions may represent, for example, the twenty-second to twenty-fifth points, respectively, on the C connector switches. The outlying stations will be divided into as many groups as there are supervisory positions, and each group will precede transmitted supervisory notes with selection characters such as SA, SB, SC or SD, assuming there are four such groups. The supervisory notes are automatically switched and transmitted to their respective supervisory positions without a so-called call letter and sequence number comparison. If it is assumed that a supervisory note is to be transmitted to the SA supervisory position, storing relays 1L, 2L and 2LA operate to establish two grounded paths through the baffle circuits thereof. One of these grounded paths extends to the assigned point, such as the twenty-second on the C connector switch, Fig. 14, and the other grounded path from the baffle circuit of the 2LA relays causes relay SAB, Fig. 15, to operate. The operation of the latter relay, in a manner similar to that pointed out above, applies a ground through jack circuits of the traffic routing board 93 to cause operation of relay AOC and another ground is established by conductor 124 to the H wiper of the second selector switch 69. The latter ground completes a circuit through the coil of relay TAOC, Fig. 7, in the intraoffice transmitter circuit causing the said relay to operate. As relay TAOC operates, it locks up by a circuit through a back contact of relay TAPA and TAOC prepares a circuit for operating relay TACC when the intraoffice transmitter is electrically connected to the supervisory position. The operation of relay TACC causes the message to be transmitted without a call letter or sequence number comparison.

*Stopping and starting line sending*

The outlying offices by sending notes preceded by selection characters, such as XA, XB, XC or XD, depending upon which supervisory group they are in, can automatically stop the switching office from sending to them. Such notes are terminated by two periods, the regular end-of-message signal, and the selection character, such as XA, in addition to stopping the line sending also switches the note to the proper supervisory position as determined by the second one of the two selection characters. Similarly, the outlying office may automatically restart the line sending by transmitting notes preceded by selection characters, such as YA, YB, YC or YD.

For the purpose of illustration, it will be assumed that there are two supervisory positions, A and B, and that an outlying office sends a note to the switching office to cease further transmission to the outlying office. As the automatic switching unit responds to the selection characters XA or XB, the X office call relay operates and through its contacts applies two grounded paths from the A or B connections of the 2L and 2LA baffle circuits. In a similar manner as set forth, one of these grounded paths extends to and marks a point on the marking level of the C connector switch while the other grounded circuit causes relay XAB, Fig. 15, to operate.

As relay XAB operates, it applies ground to three separate circuits, one for operating relay AOC, the second to conductor 124 and the third to conductor 126. The grounding of conductor 124 causes relay TAOC to operate as above outlined while the grounding of conductor 126 completes a circuit through J wiper of the second selector switch and both coils of relay TASS to potential. Relay TASS thereupon operates and locks up by a circuit including conductor 125 through the sending stop switch 135 associated with the transmitter controls of the sending position. Relay TASS in operating also applies ground to conductor 127 which extends through the coil of relay SALB to battery, also at the associated sending position and stops the line sending transmitter thereat.

The operation of relay AOC and the marking of the respective point on the K level of the C connector switch causes the intraoffice transmitter to be connected to the A or B supervisory position, depending upon which selection character A or B was sent. As in the other instances, the operation of relay TAOC causes the associated note or message to be transmitted into the supervisory position without any call letter or sequence number comparison taking place.

Subsequently, the outlying office may send a note to resume sending to the particular office and such a note will be preceded by selection characters such as YA or YB. In a similar manner, these selection characters cause operation of relay YAB, Fig. 15, to mark a point on the K level of the C connector switch and operate relay AOC to cause the wipers to advance to the associated point. Through its right hand tongue, relay YAB applies negative battery over conductor 126 and through the H level of the second selector switch 69 to the right hand coil of relay TASS. The two coils of relay TASS are opposed and negative potential through the right hand coil opposing that in the left will cause relay TASS to release, whereupon the ground is removed from the temporary stop circuit including conductor 127 and permits the line transmitter to resume operation.

*Intraoffice transmission of message*

Following the completion of the intraoffice connection between the intraoffice transmitter having the message to transmit and the appropriate intraoffice circuit, the transmission of the stored message is much the same as the transmission of a message in the arrangement described in the above-mentioned copending application Serial No. 240. In the present description, it will be assumed, that the message being switched is preceded by the following characters =P space B. DEA figure-shift 546 and that the automatic switching unit has functioned to set up a transmission path from the intraoffice transmitter to the sending position or intraoffice circuit represented by the first two of the preceding characters, namely =P.

*Initial seize circuit*

Figure 8:
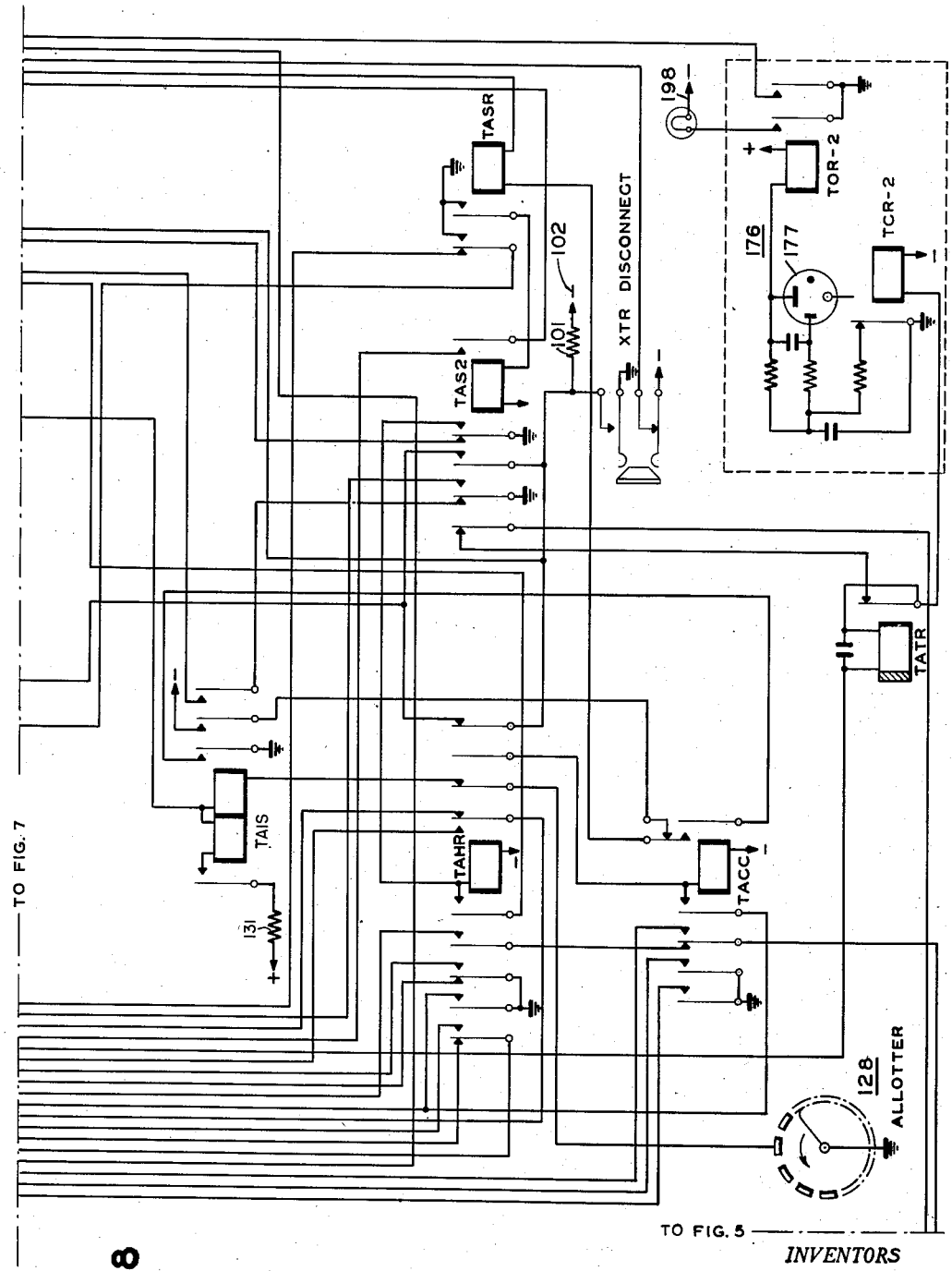

When relay TASC operates in the manner above described, the fifth right-hand tongue completes through the right-hand coil of relay TAIS and back contact of relay TAHR to a point on the allotter 128, Fig. 8, in one direction and through the eighth conductor of cable 91 and the H level of one or more of the connector switches A, B or C, the eighth conductor of cable 97 and through a 1500-ohm resistance 129 to negative potential in the other direction. The above circuit is called the initial seize circuit and is arranged so that when an intraoffice transmitter is connected to an idle intraoffice circuit, a pulse of current will flow over the initial seize circuit when the grounded wiper arm of the allotter 128 passes over the associated intraoffice transmitter segment. Accordingly, with an idle intraoffice circuit, current will flow through the right-hand winding of relay TAIS to operate it. As the relay operates, a locking circuit therefor is completed from positive potential through a resistance 131 and the right- and left-hand coils of relay TAIS to the above-described initial seize circuit. It will be noted that at this time the above circuit is from positive potential at one end to negative potential at the other end and the resistances are so proportioned that the H level wiper of the connector switch or switches involved is at the electrical center of the circuit and at substantially zero potential. Accordingly, if another intraoffice transmitter should be connected to the same intraoffice circuit no current will flow when the transmitter allotter arm passes over the associated segment of the second transmitter circuit. Therefore, the second transmitter circuit will not have its TAIS relay operated to complete its initial seize circuit.

Start circuit and private circuit

As relay TAIS operates, it completes a start circuit beginning at ground on the outer left-hand tongue and back contact of relay TAS-2, the outer right-hand tongue and front contact of relay TAIS, the front contact and fourth right-hand tongue of relay TASC, the ninth conductor of cable 91, through a resistance 132, through the J wiper of one or more of the connector switches, A, B or C, the ninth conductor of cable 97, contacts of a push button 133 and through closed contacts of the close-out switch 134 to potential.

The operation of relay TAIS also completes the so-called private circuit which begins at negative battery and extends through closed contacts of relay TAIS, the continuity contacts of relay TACC, the coil of relay TASR, the G wiper of one or more of the intraoffice connector switches, the seventh conductor of cable 97, the coils of relays SARP and SASR and the front contact of normally operated relay SABR to ground. Thus, relays TASR, SASR and SARP are operated and relay SASR causes relay SARR to operate and as the latter relay operates, it opens the circuit to relay SABR.

As relay SASR operates, the private circuit is extended through the inner right-hand tongue thereof to positive potential through the normally closed continuity contacts of relay SA4C. As relay TASR operates, it completes a circuit for operating relay TAS-2 which in turn completes a circuit for operating relay TAHR. The latter circuit in operating completes a locking circuit for itself through a front contact of relay TASC.

Transmitter operate lamp

When the circuit to relay TARA is completed in the manner previously set forth incident to the request for a connection to the automatic switching unit, its outer left-hand tongue completes a circuit including a back contact of relay TASC to the transmitter operate lamp 136 from a pair of contacts 137. The contacts 137 open and close at a relatively fast rate to apply ground to the above circuit and thereby cause the transmitter operate lamp 136 to flash. When the automatic switching unit establishes the requested transmission path from the intraoffice transmitter to the desired intraoffice circuit, relay TASC operates and completes a circuit from the transmitter operate lamp 136 to a front contact of relay TASC, a back contact of relay TASR, to a set of slow operating contacts 138. Thus the slow operating contacts 138 cause the transmitter operate lamp 136 to flash at a slower rate and thereby indicate the progress made in establishing the desired transmission path from the associated intraoffice transmitter circuit. When the private circuit is established in the manner above set forth, relay TASC is operated which establishes a circuit to ground through the transmitter operate lamp 136 and causes it to glow steadily. At the end of the message the end-of-message signal releases the intraoffice transmitter circuit and incident thereto the relays are released to open the circuit to the transmitter operate lamp whereby it is extinguished.

Automatic numbering machine

Just before a connection is made to an intraoffice circuit or the reperforator or sending position terminating such a circuit, relay SASR releases which in turn opens the circuit to relay SARR. Simultaneously relay SAFC is energized through a back contact of relay SASR and with the above mentioned relays in this position a circuit is established from negative battery through a resistance 139, back contacts of relay SA3C, the inner left-hand tongue and front contact of relay SAFC, the back contact and middle tongue of relay SARR, the back contact and seventh tongue of relay SATR, and through the start magnet SM to ground. The start magnet SM is included in an impulse unit 141 having a series of contacts which are closed in a predetermined sequence for each cycle of operation of the impulse unit and when the start magnet is energized, the impulse unit is free to operate to close its contacts.

As previously set forth, relays SASR and SARR are immediately operated when a connection is made to an intraoffice reperforator position and the operation of relay SASR through its second right-hand tongue opens the circuit to relay SAFC. However, due to the slow-to-release characteristic of relay SAFC it does not immediately release and during this interval that relay SAFC remains operated following the operation of relay SASR, the circuit to the start magnet SM of the impulse unit is opened at the back contacts of the second tongue of relay SARR and the deenergization of the start magnet causes the impulse unit 141 to come to rest.

Figure 16:
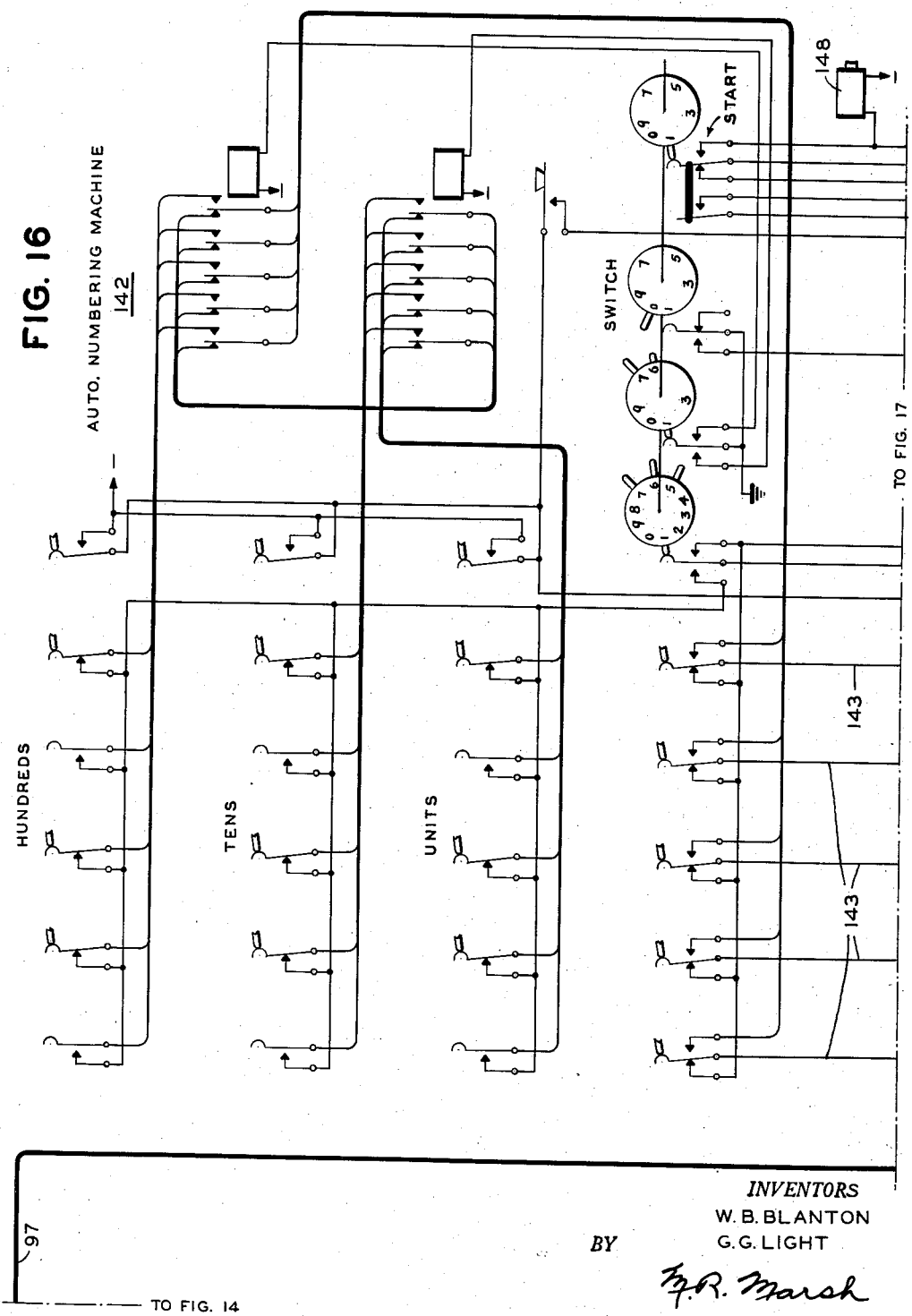
Figure 17:
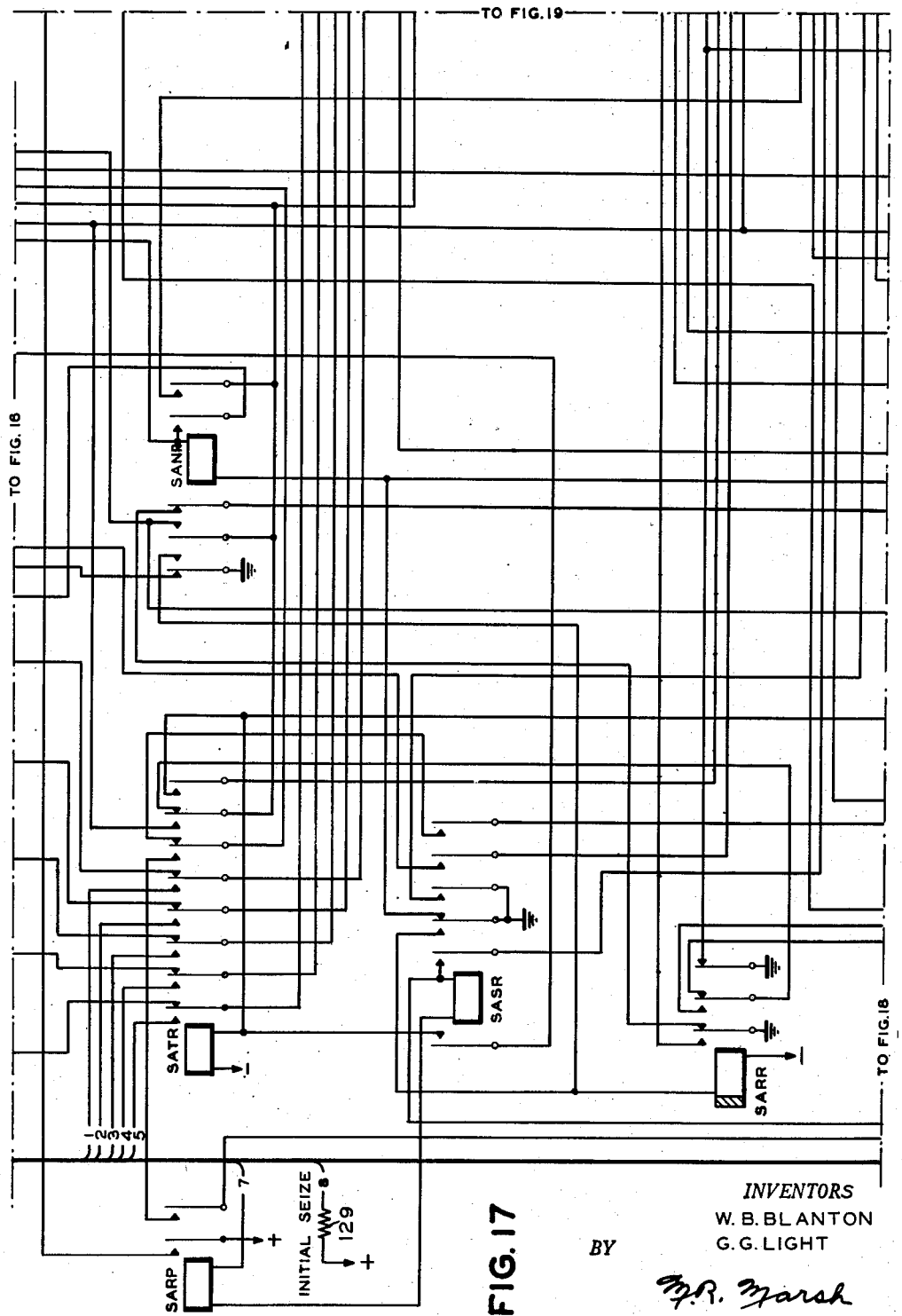
Figure 18:
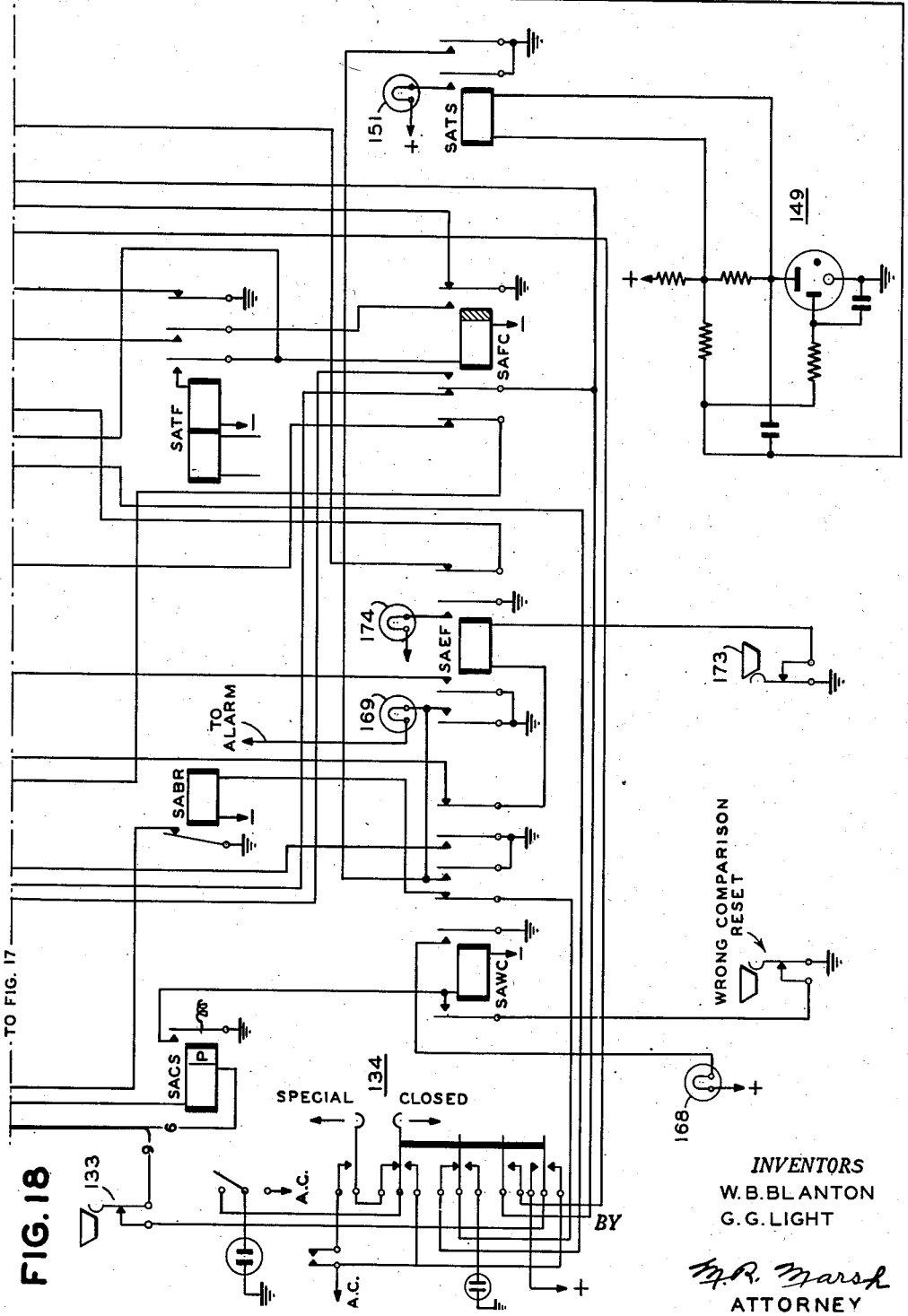

Shortly thereafter relay SAFC operates and its right-hand tongue places a ground on what might be termed the marking bus wire of the automatic numbering machine diagrammatically represented in Fig. 16. Simultaneously the first left-hand tongue of relay SAFC reestablishes the circuit to the start magnet of the impulse unit whereby it is again initiated into operation. The automatic numbering machine 142 is similar to the one shown in U. S. Patent No. 2,193,809, issued March 19, 1940, and consists of a series of drums having pins arranged to operate contacts in a predetermined manner so as to indicate coded signals representing numerals and other selected characters. The code groups set up in the automatic numbering machine 142 are transmitted into the system over five individual conductors indicated generally by reference numeral 143, and with relay SATR deenergized the circuits to these conductors are extended to one terminal of the individual contacts or contacting elements numbered 1 to 5 of the impulse unit 141. The other terminals of these elements are connected through the coils of impulse relays SA1P, SA3P and SA4P in the manner shown and through the coils of selecting magnets 144 of a reperforator 146 to potential. Accordingly the closure of the first five contacting elements of the impulse unit 141 will extend the grounds which may be applied to one or more of the conductors 143 in the numbering machine and which represent the first code group to be transmitted, through respective coils of the impulse relays and the selecting magnets 144 to potential to selectively operate the same.

Shortly thereafter the sixth or punch contacts of the impulse unit 141 close and complete a circuit for operating the punch magnet PM of the reperforator 146 whereby the code represented by the operated ones of the selector magnets 144 are perforated in the reperforator tape 147. In conjunction with the punch operation the seventh set of contacts of the impulse unit close to apply a ground through a back contact of relay SAEF, closed elements of the start group of contacts of the numbering machine, the sixth tongue and back contact of relay SATR, a front contact of relay SASR, a back contact of relay SAFC and through the coil of the numbering machine operating magnet 148 to battery. The numbering machine thereupon steps from its home position to permit the start contacts to shunt a portion of the above circuit to the operating magnet 148 and simultaneously therewith the second code to be transmitted from the numbering machine 142 is set up in the transmitting contacts thereof. Such operation of the numbering machine 142 will continue until it has transmitted a predetermined number of code groups. When the numbering machine reaches its last position, the switch contacts close to apply ground through the front contact of relay SASR and through the coil of relay SATR to potential whereby the latter relay is operated and locks up through its outer tongue.

As relay SATR operates, the first five tongues which were formerly connected by their back stops to the conductors 143, are connected through associated front contacts to the first five conductors of cable 97. At this time the circuits of these five conductors extend through the connector switches and the first five conductors of cable 91 to the front contacts of the first five tongues of relay TAXC in the intraoffice transmitter circuit. The operation of relay SATR also extends the circuit from the step contacts of the impulse unit to the front contact and outer tongue of relay SARP, the coil of relay SACS to the sixth conductor of cable 97 which extends through the connector switch and the sixth conductor of cable 91 to the inner right-hand tongue of relay TAS-2. Furthermore the operation of relay SATR extends the start magnet circuit of the impulse unit 141 through contacts of relay SA3C to battery whereby the circuit is maintained and the impulse unit will continue to rotate.

When relay SARR operated at the moment the connection was made to the intraoffice reperforator circuit, its outer right-hand tongue removed ground from the timing circuit of an electronic timer 149 to initiate operation thereof at the time of operation of the automatic numbering machine. Normally the automatic numbering machine completes its cycle before the timer 149 causes operation of relay SATS which would otherwise energize and cause lamp 151 to glow and indicate inactivity of the numbering machine. However, relay SATR normally operates before relay SATR to disable the electronic timer.

*Transmitter step operation*

When the transfer relay SATR operates, as the result of the numbering machine 142 reaching its tenth position, the next closure of the No. 7 contact of the impulse unit 141 applies a ground to both the operating magnet 148 of the numbering machine 142 and through conductors of cables 97 and 91, a front contact of relay TAS-2 in the intraoffice transmitter circuits, back contacts of relays TAWC and TAXC, through the coil of relay TAPA to potential. These grounds cause the numbering machine 142 to advance to its home or No. 1 position and also operates relay TAPA. As relay TAPA operates, it establishes a circuit through the coil of relay TAXC which at this time is short-circuited by the step pulse ground and does not operate until the step pulse contacts open. When relay TAXC operates, it extends the circuits of the five conductors of cable 91 to the five tongues of the intraoffice transmitter 3 and through its outer tongue opens the circuit holding relays TAPA and TAXC operated. As this circuit is opened, the step pulse circuit is extended through the right hand coil of relay TAXA, the winding of the step magnet SM of the transmitter 3 and a resistance to battery.

The circuit of the step magnet SM of the transmitter 3 is now extended to the step contacts of the impulse unit 141 and the tongues of the transmitter extend to the reperforator 146 so that on the next closing of the first five contacts of the impulse unit, the first character in the tape is transmitted to the reperforator. In conjunction therewith the closing of the step pulse contacts energizes relay TAXA which locks up by a circuit, including the front contact and left hand tongue of relay TAPA and a resistance to ground. This step pulse energizes the step magnet SM of transmitter 3 and causes it to hold its feeler pins down. As relay TAXA operates, it completes a circuit for operating relay TAHS which due to its slow-to-operate characteristic does not complete the circuit through its tongue until after the step pulse has been completed. When relay TAHS operates, it establishes a circuit for directing the next step pulse through the left hand winding of relay TAXA. This circuit from the outer right hand tongue and front contact of relay TAXC extends through the left hand winding of relay TAXA, closed contacts of relay TAHS and TAHR, contacts 47 of the tape lever arm and of the tape pull key 54 and the step magnet of the transmitter 3 to potential. Accordingly, the next step pulse will flow through the left hand winding of relay TAXA in opposition to the locking circuit through the right hand coil whereby the relay is deenergized. As relay TAXA releases, the locking circuit is interrupted so that at the end of the step pulse the step magnet SM will release and advance the next character over the pins of the transmitter 3. Relay TAXA in operating also opens the circuit through the coil of relay TAHS permitting the latter to release and open the circuit through the left hand winding TAXA. Following the transmission of the second character in the transmitter 3, the following step pulse will again energize relay TAXA and it will lock up and hold the step magnet SM energized as in the previous operation. Thus, by the arrangement described, the transmitter 3 operates to transmit a character for each two step pulses received in the intraoffice transmitter circuit and such operation continues until the call letter and sequence number comparison has taken place. At the end of the comparison the circuits of which will be described hereinafter, relay TACC is operated and establishes a circuit for holding relay TAHS continuously operated, whereby following step pulses are caused to divide evenly between the two windings of relay TAXA. Relay TAXA will, therefore, remain deenergized on following step pulses and the transmitter 3 will operate for each step pulse received at the intraoffice transmitter circuit.

*Call letter and sequence number comparison*

As above, it will be assumed that the message being transmitted through the switching center is preceded by the characters =P space B.DEA figures shift 546, that the intraoffice circuit is established by the =p characters, and that at the present time the character B is over the pins of the transmitter. This character B will be the first character transmitted over the intraoffice path to the reperforator 146. The reprerforator 146 is arranged with feeler pins which read the fifth preceding character punched in the tape such as 147. These feeler pins operate contacts which in a manner to be described transmit the sensed character back into the comparing equipment of the intraoffice transmitter position.

Figure 5:
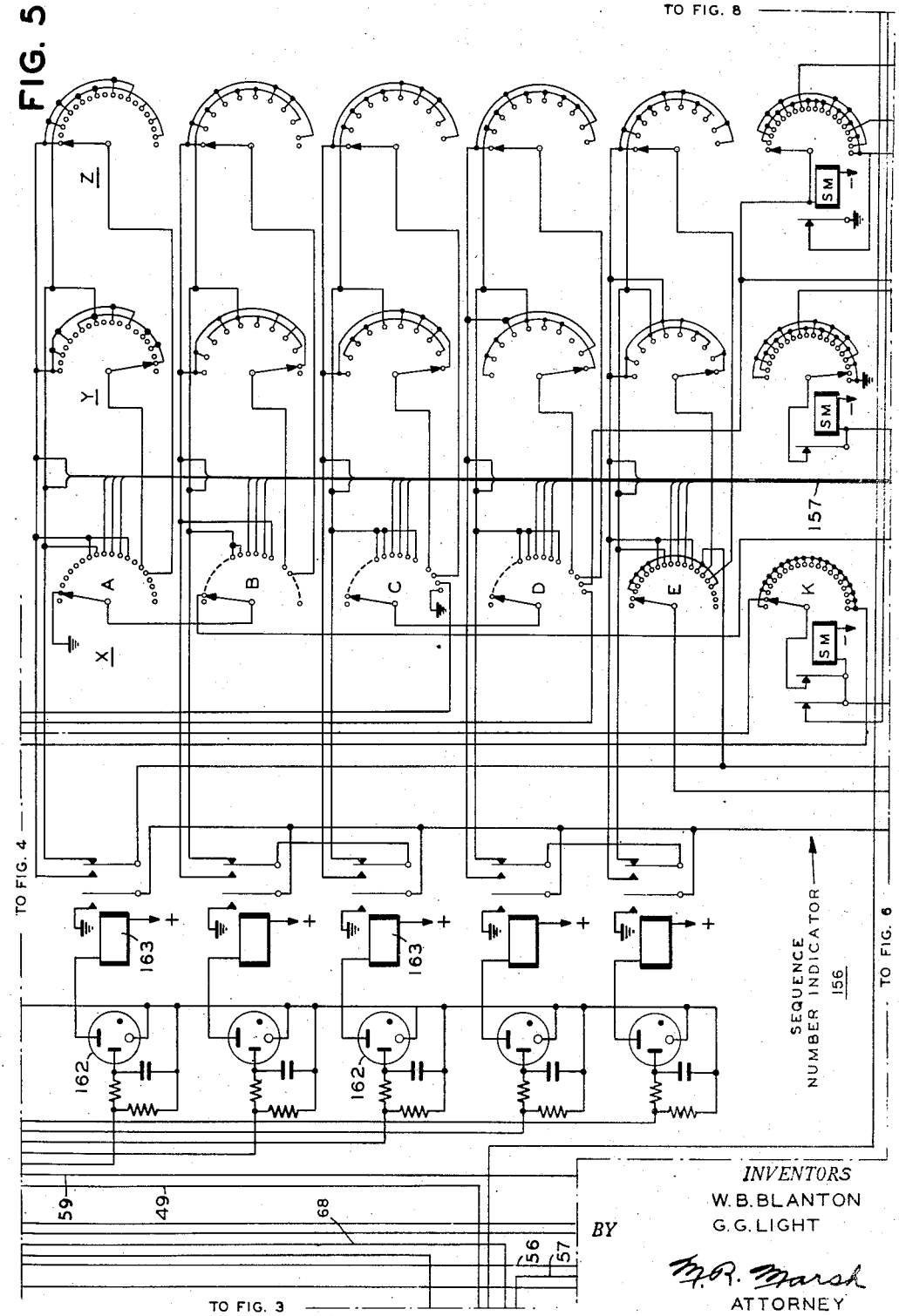
Figure 6:
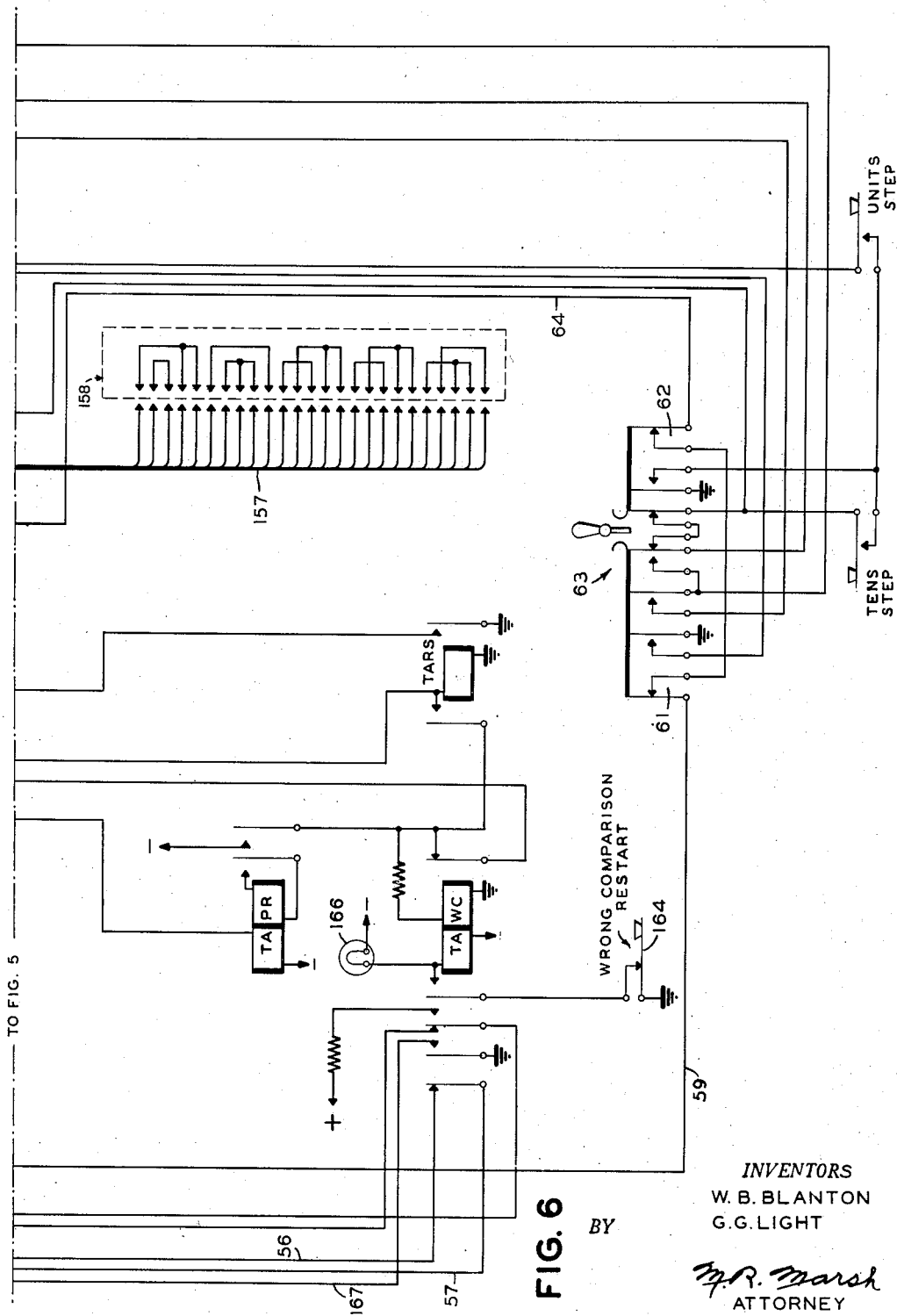

The sequence number indicator indicated generally by reference numeral 156, Fig. 5, in the intraoffice circuit is equipped with three twenty-point six-level rotary switches X, Y and Z. The switch X has connected certain contacts on the first five levels thereof, various conductors of a cable 157 which terminate in one element of a plug, the other element 158 of which is cross-connected in such a manner as to represent code combinations or the call letters of the particular intraoffice position involved. Switches Y and Z have wires on certain of the contacts thereof representing code combinations for the ten digits 1 to 0.

When the associated intraoffice transmitter circuit is idle, the X rotary switch rests on its No. 2 or home position, and when a connection is made to a sending position, relays TASR, TAS-2 and TAHR operate in the manner set forth. As relay TAHR operates, ground is applied to the No. 2 point of the K or sixth level of the X rotary switch whereby the step magnet SM is energized to advance the wipers to their No. 3 position. When relay TAXC operates at the end of the first step pulse received in the intraoffice transmitter circuit, the character B in the transmitter 3 is transmitted. The next pulse received causes operation of relay TAXC whereby the transmitter step magnet is held energized for the next character cycle during which no character is transmitted.

During the perforation of the character B by the reperforator 146 in the tape 147, the feeler pins read the fifth preceding character, which is one sent from the automatic message numbering machine 142, and selectively operate contacts 160 to apply positive potential to certain of the conductors 155 connected in parallel with contacts of the impulse unit 151 to the first five tongues of relay SATR. The above mentioned positive potential is obtained from the inner tongue and front contact of relay SARP.

Figure 4:
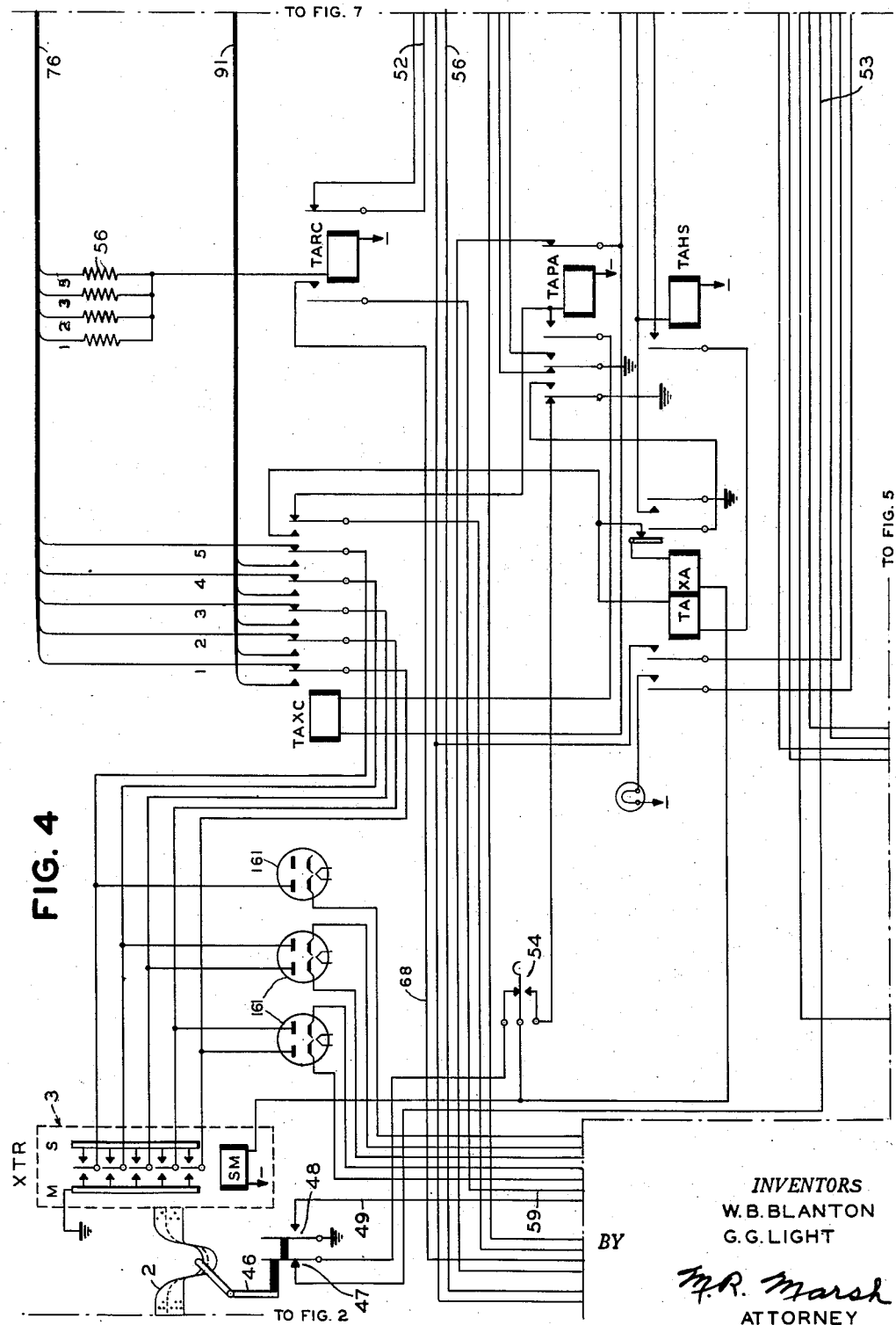

At the intraoffice transmitter circuit the positive pulses transmitted back from the reperforator position after operating vacuum tubes 161, Fig. 4, appear on the starter anodes of vacuum tubes 162. The vacuum tubes 161 pass current only in the positive direction and therefore permit only positive potential battery to appear on starter anodes of vacuum tubes 162. When such positive potential does appear on one of the vacuum tubes 162 it ionizes to cause its associated relay 163 to operate. When a relay 163 operates, there being five relays one for each pulse of a code group, a circuit is completed for the operation of relay TAPR. This relay is slightly slow to operate and assures that any of the relays 163 will have reached its stable condition before relay TAPR operates.

As relay TAPR operates, it opens the short-circuiting circuit through its other coil so that the relay is fast to release and completes a circuit through a resistance and the right hand coil of relay TAWC in parallel with a back contact of relay TAWC to the wiper of the fifth level of the X rotary switch. The third and some other points on this level are connected through the coil of relay TARS to ground. Thus the small resistance winding of relay TARS parallels the resistance in series with the right hand coil of relay TAWC and the current flowing through the parallel circuits is such that relay TAWC will not operate at this time but relay TARS will operate. When relay TARS operates, a circuit through the step magnet of rotary switch X is completed whereby the step magnet operates and its outer interrupter contacts open a circuit extending therefrom through a back contact of relay TACC, a front contact of relay TAHR to the cathode circuits of vacuum tubes 162. This causes the deionization of any of the ionized tubes and the consequent release of associated relays 163 which may have been operated. The release of these relays opens a circuit to relay TAPR which in turn releases relay TARS whereby the circuit to the step magnet of rotary switch X is opened permitting the magnet to release and advance the wipers to their No. 4 position.

Figure 19:
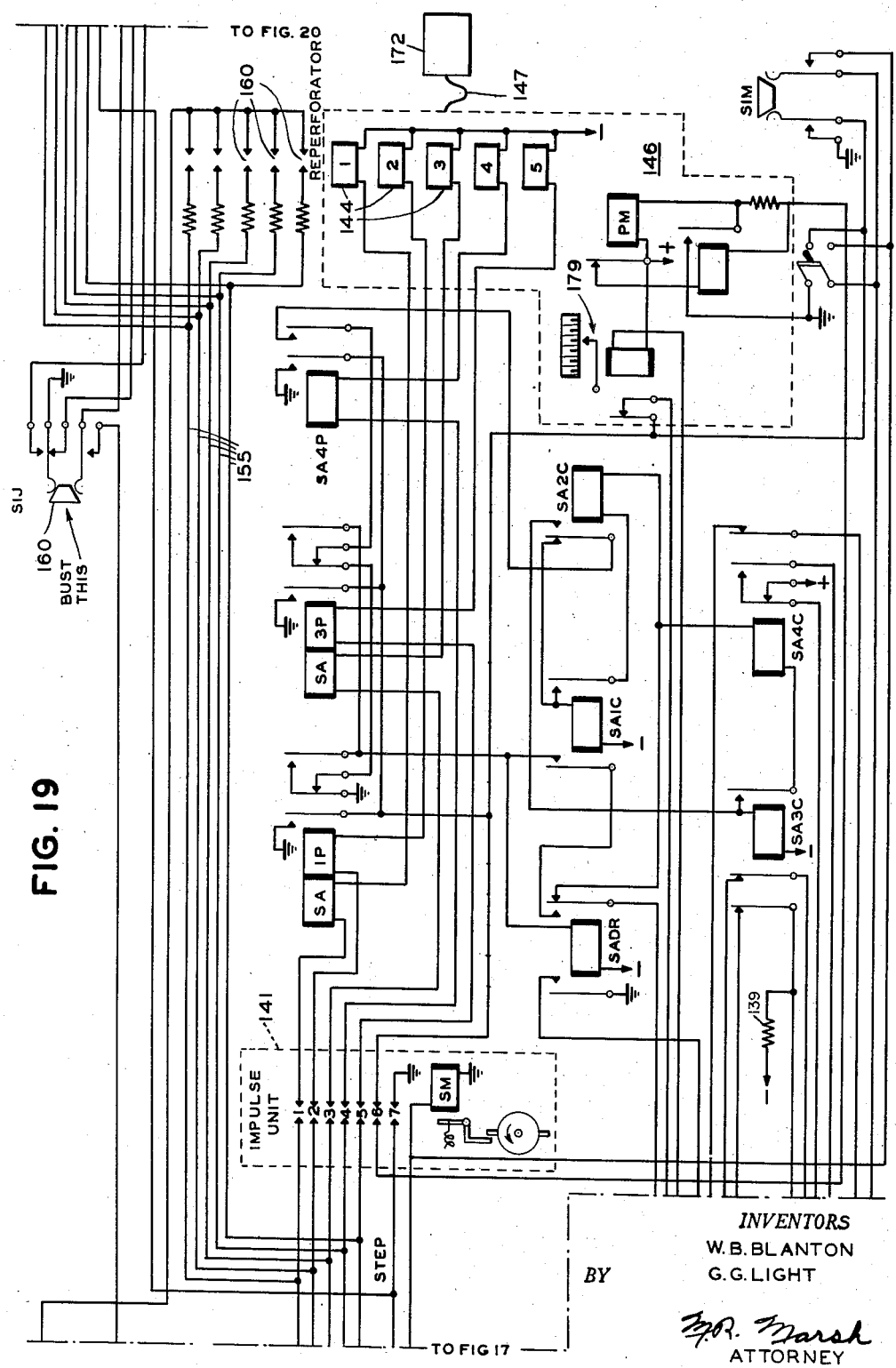

In conjunction with the transmission of the next character in the tape 2 from the transmitter 3, which character in accordance with the previous assumption will be a period, the read-back contacts 158, Fig. 19, will send back to the intraoffice transmitter circuit the fifth preceding character, one sent into the reperforator by the automatic message numbering machine, and causes relays 163 to be operated in accordance with the character. These relays, as set forth, cause relays TAPR and TARS to operate and advance the X rotary switch into its fifth position.

Such action of the sequence number indicator rotary switches will continue for the next three characters in the tape 2, namely, the characters D, E and A, during which time the X rotary switch is advanced through its fifth, sixth and seventh positions, and is now assumed to be resting in its eighth position. In conjunction with the transmitter 3 sending the "figures shift" character into the reperforator 146, the read-back contacts 158 will send back the fifth preceding character in the tape 147 which should be the character B, the first character sent to the reperforator 146 by the transmitter 3. The code combination for B is pulses 1, 4 and 5 marking, and accordingly the first, fourth and fifth of the relays 163 will be energized. The operation of any one of these relays energizes relay TAPR which applies battery to the circuit including the resistance and the right hand coil of relay TAWC.

If the code combination received back from the reperforator is the same as the code combination set up by conductors of cable 157 on the eighth set of points of the first five levels of rotary switch X, a low resistance parallel circuit around the right hand coil of relay TAWC is established from the tongue of relay TAPR, contacts of relay TAWC and the fifth level and eighth point of switch X, front contacts of the last relay 163, front contacts of the fourth relay 163, conductors of cable 157 shorted by plug 158, wipers of the D and C levels of switch X, back contacts of the third and second relays 163, the second and first wipers of switch X and a front contact of the first 163 relay and the coil of relay TARS to ground. As in the above instance, relay TARS operates but relay TAWC does not and in conjunction therewith the X rotary switch is stepped into its ninth position.

Now as the transmitter 3 sends the next code combination, the code combination sent back by the contacts 160 should represent a "period" and if it correctly compares in the sequence number indicator 156, the X rotary switch will be advanced to its tenth position. Similarly, the next read-back character will be D and if it compares correctly, switch X will be advanced to its eleventh position. Likewise, read-back characters E and A cause the switch to advance through its twelfth to its thirteenth position and the correct comparison of the figures shift will advance the switch to its fourteenth position. The next read-back character will be the hundreds digit of the message number and the fourteenth point on the fifth level of the X switch is wired similarly to the third to the seventh points. Thus, any character received back for the hundreds digit will be accepted as being correct and the switch advanced to its fifteenth position. The next read-back character will be the tens digit or four and the first five levels of switch X have their fifteenth point connected to the first five wipers of the Y rotary switch. Thus, the read-back code combination will be compared to the code set up on the Y switch and if correct the X switch is stepped into its sixteenth position. The following read-back character representing the units digit is compared with code set up on the wipers of the Z switch since the sixteenth point of the X switch extends to the wipers of the Z switch. If the comparison is correct, the X switch is stepped to its seventeenth position.

When the X rotary switch is on its seventeenth position, a circuit is completed from ground through a front contact of relay TAHR, the seventeenth point of the C or third level of rotary switch X, the C and D wipers to battery through the step magnet of the Z rotary switch. Thus, the Z or units rotary switch is advanced to indicate the next higher units digit and after making a predetermined number of steps the units switch completes a circuit for operating the step magnet of the Y or tens switch. In response to the units read-back character, the X rotary switch is advanced to its eighteenth position whereby a circuit is completed from ground on the eighteenth point of the C level through the D wiper, front contacts of relay TAHR and coil of relay TACC to battery. Relay TACC thereupon operates and locks up and opens the circuits to the cathodes of the tubes 162 whereby they will no longer respond to read-back codes. The operation of relay TACC also completes a circuit for operating relay TAHS whereby the rest of the characters perforated in the tape 2 are transmitted to the reperforator 146 at full speed. Relay TACC also removes negative potential from the private circuit and applies ground thereto. Since the tubes 162 do not respond to any more read-back characters, the switch X remains in its eighteenth position until the end of the message, at which time the de-energization of relay TAHR applies ground to all the points on the K level of this switch except the second which causes the switch to seek its home position.

By means of the above circuits there is an assurance that each message reperforated in tape 147 has appended thereto identifying characters such as the call letters of the office sending to the intraoffice transmitter circuit and the sequence number of that message. Thus even though the remainder of the message may be mutilated or parts thereof lost, the message can be easily identified and traced to the intraoffice transmitter sending the message.

*Wrong comparison*

The operation of the circuits involved will now be described in connection with the checking of a read-back character which does not compare with one of the office call letters, and it will be assumed that the X rotary switch of the office call indicator is in its eighth position ready to compare the character B (first, fourth and fifth marking) with a read-back character from the reperforator 146 consisting of 1, 2, 4 and 5 marking. In this case the first, second, fourth and fifth of the relays 163 will be operated and when relay TAPR operates only one of the parallel paths normally established thereby, the one through the right hand coil of relay TAWC, will be completed since the other path will be open through a contact of one of the 163 relays. Accordingly, relay TAWC will operate and lock through its left hand coil by a ground through the wrong comparison reset key 164 and establish a circuit for operating the wrong comparison signal light 166. The opening of the circuit through the right hand tongue of relay TAWC prevents accidental establishment of the interrupted parallel circuit once relay TAWC has been operated by a wrong comparison. The operation of relay TAWC also applies ground to conductor 167 to light the supervisory lamp 118, Fig. 7.

When relay TAWC operates, it causes the step pulse to divide and a ground to be applied to the step magnet of the transmitter 3 to continuously energize the same and thus hold the five sensing tongues to their spacing side. Relay TAWC in operating also applies positive potential to the step pulse circuit extending to the sending position to cause the polar relay SACS to operate to complete a circuit for operating relay SAWC. Relay SAWC in operating lights the wrong comparison light 168 in sending position and opens the circuit of relay SABR to prevent the sending position from picking up a new connection until relay SAWC has been deenergized. Relay SAWC in operating also completes a circuit to the supervisory lamp 169.

Figure 20:
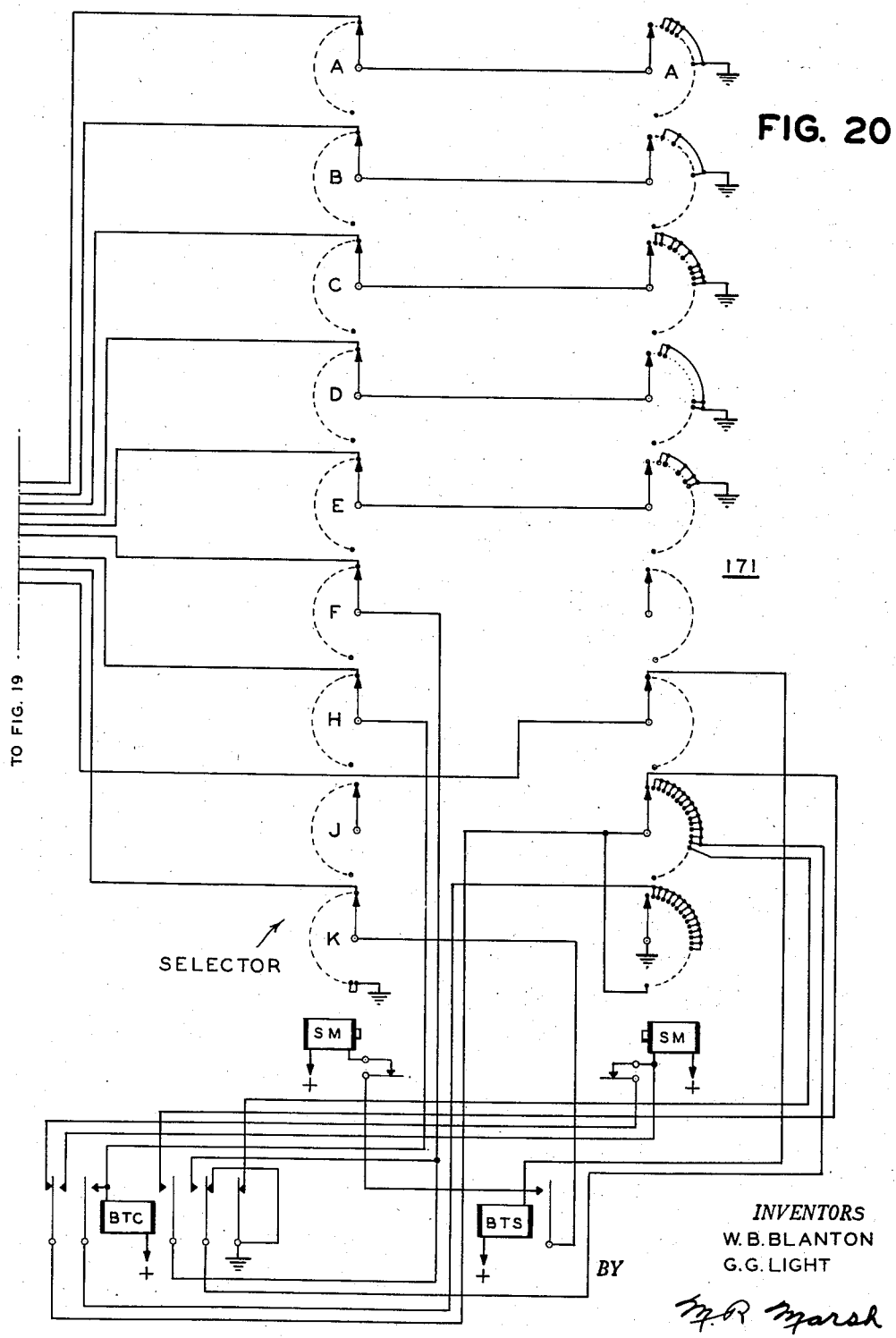

When a wrong comparison occurs at a sending position the supervisor determines that the reperforator is functioning properly and that the tape is in good condition. Thereupon the "bust this" key 169 is actuated to initiate operation of an auxiliary sending device arranged to send predetermined characters to the perforator of the involved sending position. The auxiliary transmitting device is shown in Fig. 20 and consists primarily of a pair of multiple level rotary switches and associated control relays. The actuation of the "bust this" key 169 removes the ground from the associated point on the K level of one of these rotary switches to indicate the sending position to which the automatic device is to transmit. Simultaneously a ground is applied to the H wiper of the other rotary switch and through the No. 1 contact associated therewith and the coil of relay BTS to potential. Relay BTS thereupon operates and connects the step magnet of the left hand or selector switch to the K level wiper. The points of the K level wiper extend to individual push buttons such as 169 and the points are grounded through the unoperated ones of these push buttons. Accordingly, if the wipers of the selector switch, Fig. 20, are resting on any other but the one representing the actuated push button 169, the switch will self-step until it reaches this ungrounded point. When relay SAWC operated, it applied a ground to one terminal of the lower contacts of the push button 169 which, with the button depressed, extends to an associated point on the H level of the selector switch, Fig. 20, and when the selector switch wipers reach corresponding points, the ground is extended through the coil of relay BTC to potential. Relay BTC thereupon operates and extends a circuit from the seventh set of contacts of the impulse unit 141 through the F level of the selector switch, the inner right hand tongue and front contact of relay BTC to the first point on the J level of the second rotary switch 171, Fig. 20. This wiper extends the step pulse circuit through front contacts of relay BTC to the step magnet SM of the second rotary switch 171. Accordingly succeeding step pulses will advance rotary switch 171 one step for each pulse. The first five levels of rotary switch 171 have certain points thereof grounded to represent code groups, the first of which is "space," the second "letters shift," followed by codes representing "Bust This." As will be noted, the wipers of the first five levels of switch 171 extend through wipers of the selector switch and conductors 155 to the first five contacts of the impulse unit 141. Accordingly, as the rotary switch 171 advances from its second position, the code set up on the points of rotary switch 171 are transmitted into the reperforator 146.

During advancement of the wipers of the rotary switch 171 from second to fifteenth position, relay BTC is held operated even though push button 169 is released. The locking circuit for BTC extends through points 2 to 15 of the K level of switch 171. When the switch reaches its sixteenth position, further stepping will cease unless push button 169 has been released; otherwise relay BTC will release and apply a ground to the points of the J level to cause rotary switch 171 to self-step to its home position. When the "Bust This" is transmitted to the reperforator 146, the reperforator position is disconnected from the previously connected intraoffice transmitter position. The reperforator position may be restored by depressing the Wrong Comparison Reset key to open the locking circuit of relay SAWC.

*Intraoffice transmitter restart*

On a wrong comparison, it is necessary that the tape in the intraoffice transmitter 3 be reset to the beginning of the message with which transmission will be resumed and the message waiting indicator 8 be set to indicate the proper number of the messages to be switched. Furthermore, the sequence number indicator 156 must be reset to indicate the sequence number of the first message to be transmitted. Following the disconnection of the intraoffice reperforator from the transmitter position, this being indicated by the transmitter operate lamp 136 becoming extinguished, the transmitter position may be restored into service by operating the "Wrong Comparison Restart" push button 164 to release relay TAWC.

*Disconnect*

Following the transmission of the complete message to a reperforator position, where it will appear in tape 147 to control transmitter 172, the end-of-message signal received will disconnect the reperforator position from the transmitter position. The disconnect is effected by the proper operation of impulse relays SA1P, SA3P and SA4P in responding to two consecutive period codes. Relay SA4P operates on the first period and it, in turn, operates relay SA1C and relay SA2C when relay SA4P releases. The second period causes relays SA3C and SA4C to operate, the former opening the circuit to the start magnet SM of the impulse unit 141 causing the impulse unit to come to rest. When an intraoffice transmitter circuit is connected to a sending position, the private circuit including the number 7 conductor of cable 97 has negative potential applied to it at the transmitter end. Immediately after a call letter and sequence number comparison is made and found correct, relay TACC applies ground to the transmitter end of the private circuit. Relay SA4C operating in response to the second period of an end-of-message signal removes positive potential from the private circuit and extends this circuit to ground through the coil of relay SAEF. On a correct comparison, there will be ground on the other end of this circuit, so that relay SAEF will not operate and relays SASR and TASR will become deenergized. The deenergization of these relays causes the reperforator position and the transmitter position circuits to be restored to their normal conditions where the transmitter position is in readiness to switch another message to the same or some other reperforator position and the involved reperforator position is ready to have another message switched thereto from the same to another transmitter position.

*Equipment failure signal*

If when relay SA4C operates on the end-of-message signal, relay TACC has not been operated because of failure in the comparison equipment, negative potential will still be applied to the private circuit at the intraoffice transmitter end. In this case operation of relay SA4C will extend the private circuit to ground through relay SAEF causing the latter to operate. At the same time the connection between the intraoffice transmitter and the reperforator will be maintained. As relay SAEF operates, it locks up to ground through the associated equipment reset key 173 and completes a circuit for operating the equipment failure lamp 174 as well as the supervisory lamp 169, maintains the circuit to relay SATR, and through its outer right-hand tongue opens the step pulse circuit. After determining the cause of the failure and correcting the same, the sending position may be restored by depressing the equipment reset key 173 to release relay SAEF and restore the circuits involved by its operation to their normal condition.

Switching delay signal

When the message waiting indicator 8 registers one or more unswitched messages, a circuit is completed from ground to the off-normal contacts 28 thereof through back contacts of relays TAS-2 and TATR, through the coil of relay TCR-2 to potential. Relay TCR-2 is included in an electronic timer 176 and the above circuit causes operation of the relay to start the timer into operation. A predetermined length of time after the operation of relay TCR-2, which, for example, may be in the neighborhood of two minutes, tube 177 will ionize and cause operation of relay TOR-2 which lights the switching delay lamp 178 and the supervisory lamp 118. Normally a message is switched within the two-minute period and the operation of relay TAS-2 opens the circuit to relay TCR-2 of the timer 176 to reset the same. When relay TAPR operates, it completes a circuit through the coil of relay TATR and TCR-2 to again start the timer 176. Thus if the message is not completely transmitted and the intraoffice circuit disconnected within a two-minute period, the tube 177 will ionize to cause operation of relay TOR-2 and the lighting of lamps 178 and 118. On a disconnect function relay TAPR deenergizes and opens a circuit through relays TATR and TCR-2 to reset the timer and if there is another unswitched message the timer will begin to function.

The reperforator 146, Fig. 19, of the reperforator position, may include a tape feedout arrangement indicated generally by reference numeral 179 to enable the last message character perforated in the tape to advance through the transmitter 172. The circuits of the tape feed apparatus are well known in the art and operate in conjunction with a tape lever engaging the loop in the tape 147 between the reperforator 146 and tape transmitter 172.

Various modifications of the equipment and circuits described herein and shown in the drawings will occur to those skilled in the art and it is desired that only such limitations be placed on the present invention as are imposed by the appended claims.

What is claimed is:

1. In a telegraph switching system, a switching office having a plurality of incoming and a plurality of outgoing telegraph channels, means for storing messages received over any one of said incoming channels in a first storage medium, an associated second storage medium controlling transmitting means for transmitting to an associated one of said outgoing channels, means for transferring a message stored in one of said first mediums to one of said second mediums, individual indicating means associated with each one said incoming channels for automatically establishing message identifying codes and means for checking a part of the signals transferred to a second storage medium against signal representations established in said indicating means of the channel of the first storage medium from which the message is transferred.

2. In a telegraph switching system, a storage controlled code signal transmitter, a plurality of reperforators, means for establishing a transmission path from said transmitter to a selected one of said reperforators whereby said reperforator stores codes received from said transmitter in a second storage medium, a device for automatically establishing codes to identify said transmitter, and means for comparing predetermined of the codes stored in said second medium with those established by said device.

3. In a telegraph switching system, a storage controlled code signal transmitter, a plurality of reperforators, means for establishing a transmission path from said transmitter to a selected one of said reperforators whereby said reperforator stores message code groups received from said transmitter in a second storage medium with each of said message groups in said second medium including message and transmitter identifying codes, and means to automatically check the message and transmitter identifying codes stored in said second storage medium against other codes representing the message and transmitter.

4. In a telegraph switching system, a storage controlled code signal transmitter, a plurality of reperforators, means for establishing a transmission path from said transmitter to selected ones of said reperforators one at a time whereby said reperforators store message code groups received from said transmitter in second storage mediums with each of said message groups in said second medium including message and transmitter identifying codes, means for automatically setting up electrical message and transmitter identifying codes, and means to automatically check the message and transmitter identifying codes stored in said second storage mediums against said last mentioned codes.

5. In a telegraph switching system, a storage controlled code signal transmitter, a plurality of reperforators, means for establishing a transmission path from said transmitter to a selected one of said reperforators whereby said reperforator stores message code groups received from said transmitter in a second storage medium with each of said message groups in said second medium including message and transmitter identifying codes, means to automatically compare the message and transmitter identifying codes stored in said second storage medium against other automatically established codes representing the message and transmitter, and means operative on the failure of said message and transmitter identifying codes to correctly compare with said established codes to halt operation of said reperforator.

6. In a telegraph switching system, a storage controlled code signal transmitter, a plurality of reperforators, means for establishing a transmission path from said transmitter to a selected one of said reperforators whereby said reperforator stores codes received from said transmitter in a second storage medium, a device for establishing codes to identify said transmitter, means for comparing predetermined of the codes stored in said second medium with those established by said device, an alarm device and means for operating said alarm device when the compared codes stored in said second medium are different from those established by said device.

7. In a telegraph switching system, a storage controlled code signal transmitter, a plurality of reperforators, means for establishing a transmission path from said transmitter to a selected one of said reperforators whereby said reperforator stores codes received from said transmitter in a second storage medium, means establishing electrical connections to represent codes identifying said transmitter and message numbers, means for comparing predetermined of the codes stored in said second medium with those established by said means, and means to disestablish said transmission path when the compared codes are different.

8. In a telegraph switching system, a switching center having a plurality of incoming channels and a plurality of outgoing channels, individual switching mechanisms for each incoming channel for establishing transmission paths therefrom, one at a time, to selected outgoing channels, control means common to a plurality of said switching mechanisms for controlling the same, means for automatically associating said control means with said switching mechanisms one at a time to control the same independently of paths established through other of said controlled switching mechanisms, an alarm and means operative on the failure of said control means to control a switching mechanism to establish a transmission path within a predetermined length of time after association with one of said switching mechanisms to operate said alarm.

9. In a telegraph switching system, a switching center having a plurality of incoming channels and a plurality of outgoing channels, signal storage and repeating equipment associated with each incoming channel for storing received messages, switching mechanisms individual to each incoming channel for establishing transmission paths one at a time from associated repeating equipment to selected outgoing channels, a common control means for said switching mechanisms, said control means controlling one of said switching mechanisms at a time and independently of paths established through other of said switching mechanisms, means controlled by the number of unrepeated stored messages for electrically requesting the common control means to control the associated switching mechanism, an alarm and means for operating said alarm when said request is not answered within a predetermined period.

10. In a telegraph switching system, a switching center having a plurality of incoming channels and a plurality of outgoing channels for the transmission of message groups of signals, individual switching mechanisms associated with each incoming channel for establishing transmission paths therefrom, one at a time, to selected outgoing channels, automatic control means for said switching mechanisms, said control means controlling one of said switching mechanisms at a time and independently of paths established through other of said switching mechanisms, means for indicating the number of unswitched message groups received over an incoming channel, and means controlled by said last mentioned means to initiate operation of said control means and switching mechanism to establish a transmission path.

11. In a telegraph switching system, a switching center having a plurality of incoming channels and a plurality of outgoing channels, signal storage and repeating equipment associated with each incoming channel for storing received messages, switching mechanisms individual to each incoming channel for establishing transmission paths one at a time from associated repeating equipment to selected outgoing paths, means controlled by the number of unrepeated stored complete messages for initiating into operation the associated switching mechanisms.

12. In a telegraph switching system, a switching center having a plurality of incoming channels and a plurality of outgoing channels, signal storage and repeating equipment associated with each incoming channel for storing received messages, automatic switching mechanisms individual to each incoming channel for establishing transmission paths one at a time from associated repeating equipment to selected outgoing channels, normally inoperative means responsive to selecting code signals accompanying each message group for controlling said switching mechanisms, means for indicating the number of unrepeated complete stored messages and means controlled by said last mentioned means for initiating operation of said normally inoperative signal responsive means.

13. In a telegraph switching system, a switching center having a plurality of incoming channels and a plurality of outgoing channels, signal storage and repeating equipment associated with each incoming channel for storing received messages, switching mechanisms individual to each incoming channel for establishing transmission paths one at a time from associated repeating equipment to selected outgoing channels, a common control means for said switching mechanisms, means controlled by the unrepeated complete stored messages for conditioning said common control means to control the associated switching mechanism to establish a transmission path, an alarm and means for operating said alarm when said transmission path is not established within a predetermined period.

14. In a telegraph switching system, a switching center having a plurality of incoming channels and a plurality of outgoing channels, signal storage and repeating equipment associated with each incoming channel for storing received messages, switching mechanisms individual to each incoming channel for establishing transmission paths one at a time from associated repeating equipment to selected outgoing channels, a common control means for said switching mechanisms, a message waiting indicator to indicate the number of unrepeated complete stored messages at the storage and repeating equipment of an incoming channel, and means controlled by said indicator to initiate said control means and switching mechanisms into operation to establish a transmission path.

15. The method of operating the switching center of a telegraph switching system which comprises the steps of storing message signals received over incoming lines in associated first storage mediums, transmitting the stored messages intraoffice to a sending position associated with an outgoing line and restoring the same thereat in a second storage medium and checking at least a part of the signals of each message stored in said second storage medium against independently established codes identifying the first storage medium in which the representative message appears.

WILLIAM B. BLANTON.
GEORGE G. LIGHT.

REFERENCES CITED

The following references are of record in the file of this patent:

UNITED STATES PATENTS

| Number | Name | Date |
|---|---|---|
| 1,738,564 | Christian | Dec. 10, 1929 |
| 1,970,337 | Pope | Aug. 14, 1934 |
| 2,088,750 | Kinkead | Aug. 3, 1937 |
| 2,193,967 | Kleinschmidt | Mar. 19, 1940 |
| 2,293,704 | Blanton | Aug. 25, 1942 |
| 2,369,935 | Bacon | Feb. 20, 1945 |